US009530633B2

(12) United States Patent
Satulovsky et al.

(10) Patent No.: US 9,530,633 B2
(45) Date of Patent: Dec. 27, 2016

(54) METHOD FOR ISOMER DISCRIMINATION BY TANDEM MASS SPECTROMETRY

(75) Inventors: Javier E. Satulovsky, Santa Clara, CA (US); Magdalena Anna Bynum, Mountain View, CA (US); Gregory Staples, San Francisco, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 832 days.

(21) Appl. No.: 13/114,932

(22) Filed: May 24, 2011

(65) Prior Publication Data

US 2011/0295521 A1 Dec. 1, 2011

Related U.S. Application Data

(60) Provisional application No. 61/348,089, filed on May 25, 2010.

(51) Int. Cl.

| | |
|---|---|
| ***H01J 49/26*** | (2006.01) |
| ***G06F 19/00*** | (2011.01) |
| ***H01J 49/00*** | (2006.01) |

(52) U.S. Cl.
CPC .................................. *H01J 49/0036* (2013.01)

(58) Field of Classification Search
CPC . C12Q 1/6872; G01N 33/6848; H01J 49/0036
(Continued)

(56) References Cited

U.S. PATENT DOCUMENTS 5,538,897 A * 7/1996 Yates et al. ..................... 436/89
5,850,623 A * 12/1998 Carman, Jr. .............. G01J 3/28 250/252.1
(Continued)

FOREIGN PATENT DOCUMENTS

| | | |
|---|---|---|
| GB | 2410609 | 8/2005 |
| WO | WO0197251 | 12/2001 |

OTHER PUBLICATIONS

Eng et al. ("An approach to correlate tandem mass spectral data of peptides with amino acid sequences in a protein database", Journal of the American Society for Mass Spectrometry, 1994, 5:976-89).*
(Continued)

*Primary Examiner* — Regis Betsch
*Assistant Examiner* — Lisa Peters

(57) ABSTRACT

Systems and method for mass spectrometry are presented. In one embodiment, a method comprises: (a) acquiring one or more fragmentation signatures for a reference sample, wherein each fragmentation signature of the reference sample is acquired with a unique tandem mass spectrometry mode; (b) identifying one or more discriminate features across the plurality of fragmentation signatures of the reference sample; (c) acquiring one or more fragmentation signatures for an unknown sample, wherein each fragmentation signature of the unknown sample is acquired according to the discriminant features of step (b); (d) identifying one or more discriminate features across the plurality of fragmentation signatures of the unknown sample; (e) scoring the fragmentation signatures of step (c) by comparing the discriminate features of the reference sample, from step (b), against the discriminate features of the unknown sample, from step (d); and (f) identifying a structural isomer based on the score of step (e).

20 Claims, 24 Drawing Sheets

(58) Field of Classification Search
USPC ........... 702/28; 250/282, 281; 356/300, 326; 436/171, 173, 63, 66, 97
See application file for complete search history.

(56) References Cited

U.S. PATENT DOCUMENTS

| | | | | |
|---|---|---|---|---|
| 6,936,813 | B2 | 8/2005 | Zavitsanos et al. | |
| 7,109,038 | B2 * | 9/2006 | Scholl et al. | 436/66 |
| 7,117,103 | B2 | 10/2006 | Szelewski et al. | |
| 7,457,708 | B2 | 11/2008 | Thompson et al. | |
| 7,462,818 | B2 | 12/2008 | Zweigenbaum et al. | |
| 7,595,485 | B1 | 9/2009 | Sadygov et al. | |
| 8,481,924 | B2 * | 7/2013 | Savitski | H01J 49/0045 250/281 |
| 2005/0165560 | A1 * | 7/2005 | Kushnir | H01J 49/0009 702/30 |
| 2005/0192755 | A1 | 9/2005 | Nagalla et al. | |
| 2008/0120606 | A1 * | 5/2008 | Stanley | G06F 17/3092 717/136 |
| 2008/0142696 | A1 * | 6/2008 | Geromanos et al. | 250/282 |
| 2010/0288917 | A1 * | 11/2010 | Satulovsky | H01J 49/0031 250/282 |

OTHER PUBLICATIONS

Eng, et al., "An approach to correlate tandem mass spectral data of peptides with amino acid sequences in a protein database", Journal of the American Society for Mass Spectrometry, 1994, 5:976-89.
Darland et al. "Superior Molecular Formula Generation from Accurate-Mass Data", Agilent Technologies, Inc., 2008; available at: http://www.chem.agilent.com/en-US/Search/Library/_layouts/Agilent/PublicationSummary.aspx?whid=54471&liid=457.
Hill, et al. "Automated assignment of high-resolution collisionally activated dissociation mass spectra using a systematic bond disconnection approach", Rapid Communications in Mass Spectrometry, vol. 19, Issue 21, pp. 3111-3118, 2005.
Olsen, et al. "Parts per million mass accuracy on an Orbitrap mass spectrometer via lock mass injection into a C-trap", Molecular & Cellular Proteomics, vol. 4, Issue 12, 2010-2021, 2005.

* cited by examiner

Fragments as a function of energy, starting from the left: m/z = 760.79 (precursor), m/z = 204.087 (GlcNAc )

Fragments as a function of energy, starting from the left: m/z = 1317.491 (2000), m/z = 114.414 (1000), m/z = 749.281, m/z = 366.139 (GlcNAc), m/z = 138.054 (GlcNAc fragment)

Average of fragment m/z = 528.191 over five mCE measurements of a tri-antennary glycan has considerably less fluctuations than any of the individual low signal/noise curves.

METHOD FOR ISOMER DISCRIMINATION BY TANDEM MASS SPECTROMETRY

CROSS REFERENCE TO RELATED APPLICATIONS

Pursuant to 35 U.S.C. §119(e), this application claims priority to the filing date of U.S. Provisional Patent Application Ser. No. 61/348,089 filed May 25, 2010; the disclosure of which application is herein incorporated by reference.

SUMMARY

Systems and method for mass spectrometry are presented. Such systems and methods are particularly useful for identifying structural isomers. In one embodiment, a method comprises: (a) acquiring one or more fragmentation signatures for a reference sample, wherein each fragmentation signature of the reference sample is acquired with a unique tandem mass spectrometry mode; (b) identifying one or more discriminate features across the one or more fragmentation signatures of the reference sample; (c) acquiring one or more fragmentation signatures for an unknown sample, wherein each fragmentation signature of the unknown sample is acquired according to the discriminant features of step (b); (d) identifying one or more discriminate features across the one or more fragmentation signatures of the unknown sample; (e) scoring the fragmentation signatures of step (c) by comparing the discriminate features of the reference sample, from step (b), against the discriminate features of the unknown sample, from step (d); and (f) identifying a structural isomer based on the score of step (e).

BRIEF DESCRIPTION OF THE FIGURES

The accompanying drawings, which are incorporated herein, form part of the specification. Together with this written description, the drawings further serve to explain the principles of, and to enable a person skilled in the relevant art(s), to make and use the claimed systems and methods.

DETAILED DESCRIPTION

The present invention generally relates to mass spectral (MS) analysis. More specifically, the present invention relates to systems and methods for identifying structural isomers.

Figure 1:
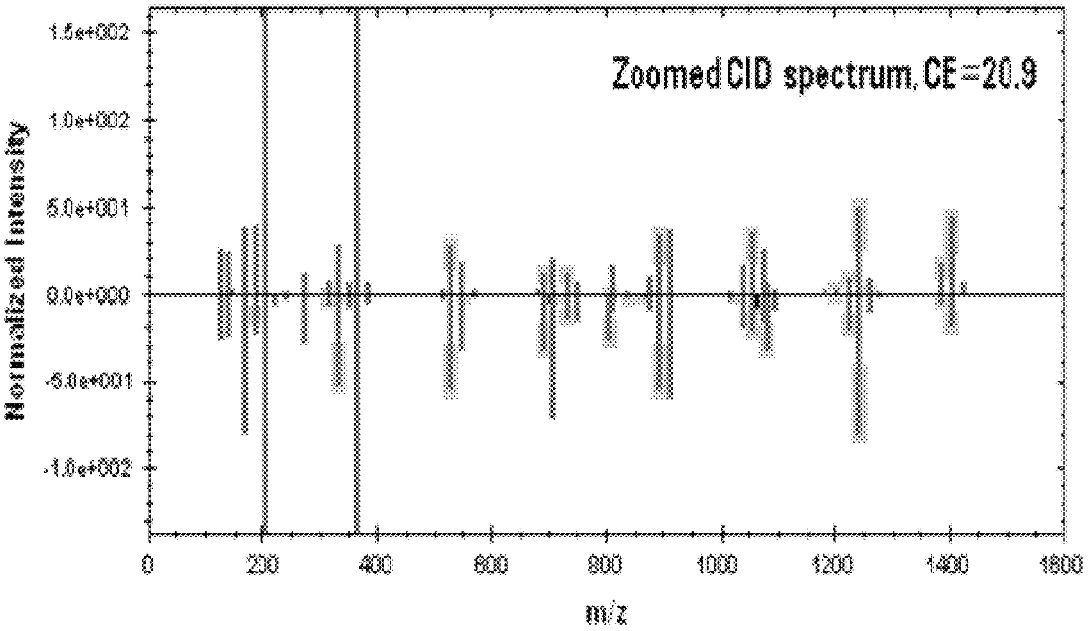
FIG. 1 shows fragment comparisons between two antibody G1 isomers.

Identifying structural isomers (e.g., by tandem mass spectrometry) is challenging. Product ion scans of structural isomers can share most of the intense fragment ions from the scan, which makes most common spectral similarity algorithms not sensitive enough to distinguish between different structural isomers. For example, FIG. 1 shows how most of the fragments of two antibody G1 isomers have identical masses within a tolerance of 30 ppm.

Currently, the way to discriminate structural isomers is to manually acquire product ion scans of each isomer, observe a unique fragment that appears in just one of the scans, and try to explain its unique presence based on the topological differences of the isomers. There are several problems with this approach. First, this approach is very labor intensive, and not suited for high throughput automated analysis. Second, this approach is prone to errors by the human operator. Further, the unique fragment may not theoretically exist (e.g., stereo-isomers), or the unique fragment may theoretically exist, but is not observed experimentally due to constraints of the fragmentation process. Also, the fragmentation energy (or fragmentation conditions) to acquire the MS/MS scans may not be the right one to distinguish the isomers. This approach also misses the fact that a single fragment alone may not distinguish isomers, for example, isomer A from isomer B and C in FIG. 2.

Figure 2:
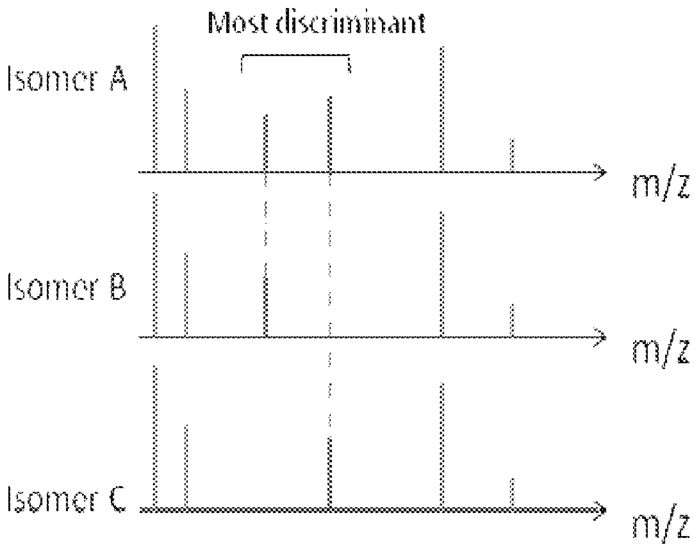
FIG. 2 shows three exemplary isomer scans to illustrate an aspect of the present invention.

In FIG. 2, the two fragments highlighted do not exclusively belong to isomer A, but as a pair, they do. Given a family of isomers of interest, the invention enables a user to: (1) identify the group of most discriminant fragments that distinguishes a particular isomer from all other isomers in the family; (2) given the group of most discriminant fragments, acquire an uncharacterized sample using a tandem mass spectrometer; and (3) determine, through a scoring mechanism, which of the isomers are present in the MS/MS scans acquired.

A unique advantage of this invention is the ability to determine, even for chromatographically unresolved isomers, the relative ratios of isomers given an MS/MS scan or a number of MRM transitions. Determining the relative ratios of isomers is very useful in the characterization of glycan isomers, for example, and not limited to glycan isomers from therapeutic antibodies, as well as glycans that are indicative of disease state. Isomers with the incorrect structural features can lead to immunogenicity in the case of a therapeutic antibody. For analysis of diagnostics glycans, structural isomers can differentiate healthy from diseased patients.

The methods described here allow a user to discriminate isomers, and provide a library of signature spectra that will enable rapid scanning and detection and identification of glycan structures and isomers.

Further, while glycan isomers can be reasonably well separated chromatographically, the separation adds to the run time. With the methods described here, the isomeric structures that are not separated chromatographically can be distinguished by calculating the superposition of the signature spectra for each isomer and comparing it to the obtained data. For example, while a ten minute gradient can resolve structural isomers, a one minute gradient cannot. With this method isomers can be detected within the one minute gradient resulting in a rapidly accelerated workflow.

In one aspect of the present invention, the systems and methods provided automate labor intense and error prone processes that were previously performed by an expert.

For example, in one embodiment, there is provided a mass spectrometry method for identifying structural isomers, the method comprising: (a) acquiring one or more fragmentation signatures for a reference sample, wherein each fragmentation signature of the reference sample is acquired with a unique tandem mass spectrometry mode; (b) identifying one or more discriminate features across the one or more fragmentation signatures of the reference sample; (c) acquiring one or more fragmentation signatures for an unknown sample, wherein each fragmentation signature of the unknown sample is acquired according to the discriminant features of step (b); (d) identifying one or more discriminate features across the one or more fragmentation signatures of the unknown sample; (e) scoring the fragmentation signatures of step (c) by comparing the discriminate features of the reference sample, from step (b), against the discriminate features of the unknown sample, from step (d); and (f) identifying a structural isomer based on the score of step (e). The unique tandem mass spectrometry modes may be multiple collision energy measurements. The method may further include: (1) identifying a group of most discriminant fragments that distinguishes a particular isomer from all other isomers in a family; (2) acquiring an uncharacterized sample using a tandem mass spectrometer, given the group of most discriminant fragments; (3) determining, through the scoring of step (e), which isomers are present based on acquired spectra; (4) determining, for chromatographically unresolved isomers, relative ratios of isomers given the tandem mass spectra of step (c); (5) calculating a superposition of a signature spectra for each isomer; and/or (6) comparing the superposition to obtained data.

In another embodiment, there is provided a mass spectrometer system, the system comprising: (a) a library of spectra including one or more fragmentation signatures for reference samples, wherein each fragmentation signature of the reference sample is acquired with a unique tandem mass spectrometry mode, wherein one or more discriminate features are identified across the one or more fragmentation signatures of the reference samples; (b) an acquisition module for acquiring one or more fragmentation signatures for an unknown sample, wherein each fragmentation signature of the unknown sample is acquired with the corresponding unique tandem mass spectrometry mode of the reference samples, and wherein one or more discriminate features across the one or more fragmentation signatures of the unknown sample are identified; and (c) a processor module for scoring the fragmentation signatures of the unknown samples by comparison with the discriminate features of the reference sample to thereby identify a structural isomer based on the score. The unique tandem mass spectrometry modes may be multiple collision energy measurements. The processor module may be further configured to: (1) identify a group of most discriminant fragments that distinguishes a particular isomer from all other isomers in a family; (2) acquire an uncharacterized sample using a tandem mass spectrometer, given the group of most discriminant fragments; (3) determine, through the score, which isomers are present based on acquired spectra; and/or (4) determine, for chromatographically unresolved isomers, relative ratios of isomers given an MS/MS scan or a number of MRM transitions.

Building Multiple Collision Energy Libraries.

In one embodiment, MS/MS scans of each isomer of interest are acquired at different fragmentation energies. As used herein, such measurements will be referred to as "mCE measurement" or "multiple collision energy measurements". The multiple energy acquisition can be implemented through a preferred inclusion list in a quadropole time-of-flight (QTOF), or through a custom modification of the firmware of the QTOF in which each ion selected for MS/MS is acquired multiple times at specified collision energy values.

Figure 3:
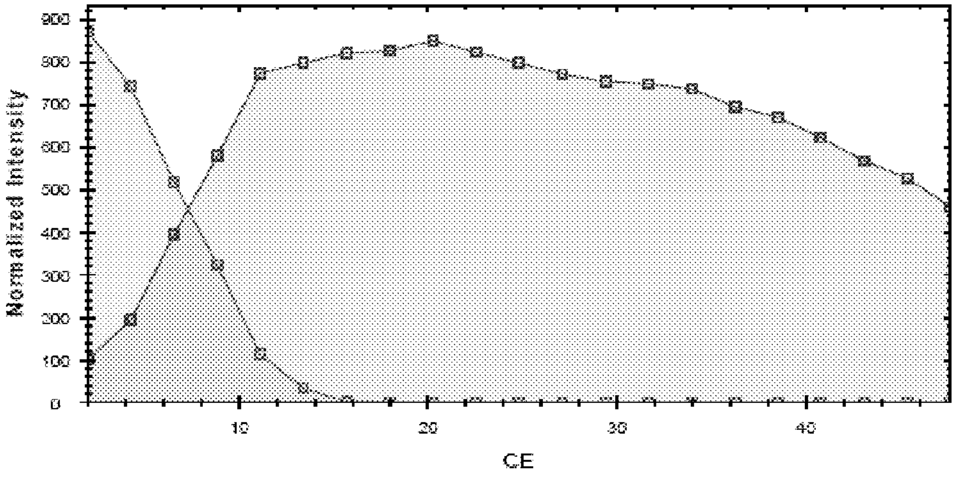
FIG. 3 shows examples of fragments of a tri-antennary glycan.
Figure 3:
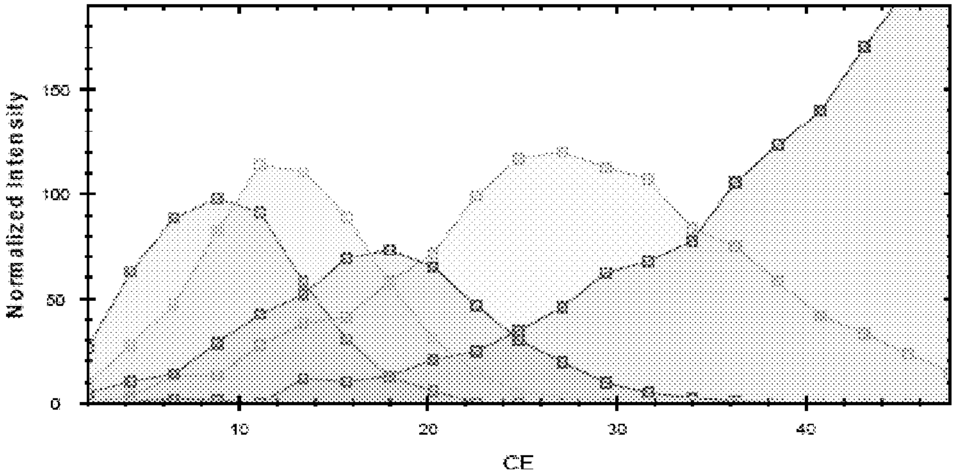

In some embodiments, the fragmentation energy difference among two consecutive MS/MS scans is small enough that any real fragment is observed in a finite number of consecutive scans. As used herein, fragmentation energy will simply be referred to as "energy." Also, the total number of scans is preferably large enough that it spans the fragmentation space of the isomer: in the MS/MS scan at the lowest energy, mostly precursor is observed, while scans at the highest energies have no precursor or large fragments left. FIG. 3 shows examples of some fragments of a tri-antennary glycan (precursor m/z=760.79, Z=2) fragmented with 17 energy values.

After acquisition, each MS/MS scan can be normalized once in order to make fragment intensities at any energy independent of precursor intensity. For each scan, the intensity of the "N" most intense fragments are added, and the intensity of each fragment is re-defined as its original intensity divided by the sum of the N most intense fragments. N from 3 to 5 was tried with good results. N can be extended to larger numbers, but if N becomes too big and starts to approach the total number of fragments in the spectrum, removal of small fragments through any de-noising filter will change the value of the normalized ion intensities and be undesirable. Examples of such filters are library curation methods as provided in co-pending U.S. patent application Ser. No. 12/938,953, filed Nov. 3, 2010, which is herein incorporated by reference in its entirety. As used herein, the terms "counts" or "intensity" will refer to the normalized intensity of a fragment. Also, in one embodiment, all normalized intensities were multiplied by 1000 (any large number would work) for ease of visualization.

Figure 4:
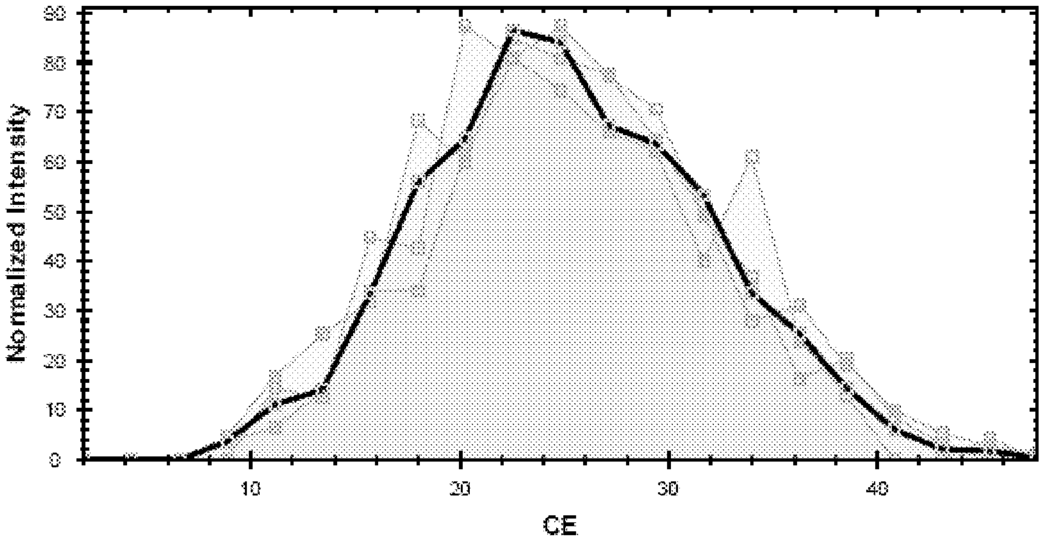
FIG. 4 shows an averaging of normalized MS/MS scans.

In one embodiment, the present invention requires fragments to change smoothly/gradually as a function of the energy, which may not be the case for low signal/noise measurements. In those scenarios, since MS/MS scans are normalized, they can be averaged to obtain a better signal, as shown in FIG. 4. When averaging low signal to noise ratio fragments, if a fragment is not present in at least 30% of the mCE measurements, it is discarded, since it is considered unreliable.

Averaging multiple mCE measurements is important even in mCE measurements with high signal, because together with the average intensity, the standard deviation of a fragment's intensity can be estimated at any given energy. The standard deviation is used as a correlate of the reproducibility of the measurement of the average signal at a particular energy. If for some reason multiple mCE measurements are not available or impractical, a conservative estimate of the standard deviation is assigned, being 20 to 25% of the fragment signal. The optimal estimate may depend on the instrument use and the acquisition conditions.

Figure 5:
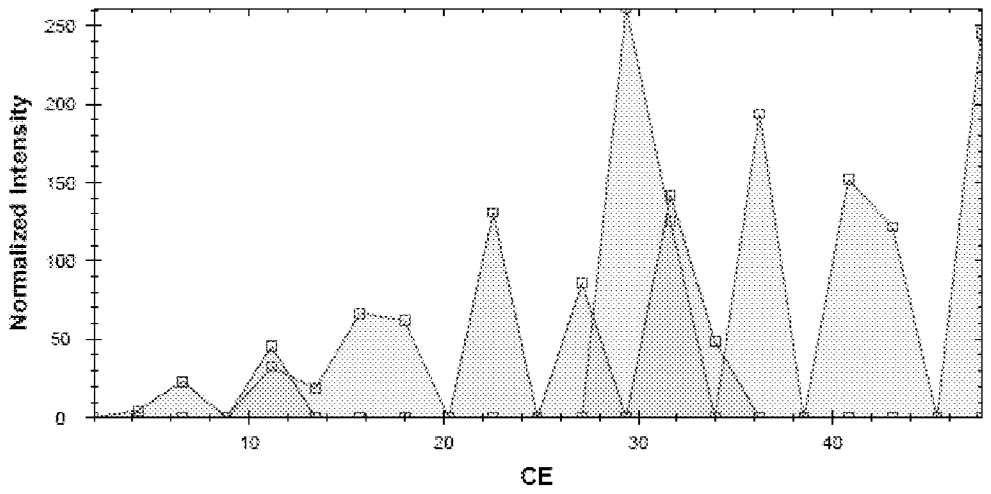
FIG. 5 shows examples of fragments for discarding.

Further filters may be applied to the normalized MS/MS spectra to remove low quality fragments (possibly originating from chemical or electronic noise). For example, if the fragment intensity as a function of energy rises and falls several times, and these intensity changes are large enough compared to the value of the signal, it may be determined to discard them, not consider them, or simply penalize them during method development and scoring (this is described in the next sections). FIG. 5 shows examples of fragments for discarding.

Efficient Method to Increase Mass Accuracy and Calculate Experimental Mass Accuracy Through Multiple Energy Library.

Because there are several (e.g., 18) individual spectra of each compound, and each fragment tends to span at least seven energy levels, the m/z values can be averaged for each fragment and the averaged value can be re-assigned to each spectrum. The advantage of working with such higher accuracy m/z values is more accurate results in any subsequent workflow that compares m/z values of two particular compounds at two particular energies. An example is the scoring of a spectrum-to-spectrum match.

Another advantage of these multiple acquisitions of the same fragment is being able to calculate the standard deviation of the fragment around the average value and determine, based on the intensity of the fragment, if the mass accuracy in the experiment was abnormally low. By "mass accuracy," it is meant the ability of reproducing an observed m/z value across repeated measurements.

Furthermore, based on the observed standard deviation of each m/z value around its mean, an empirical table of the accuracy of the instrument can be built as a function of m/z and intensity (e.g., the intensity of each fragment from each spectrum can be accessed, too). This empirical mass accuracy calculation can be used to improve operations involving comparisons of m/z values (e.g., identifying an unknown against the library through some matching experimental MS/MS data against data from the library).

Figure 6:
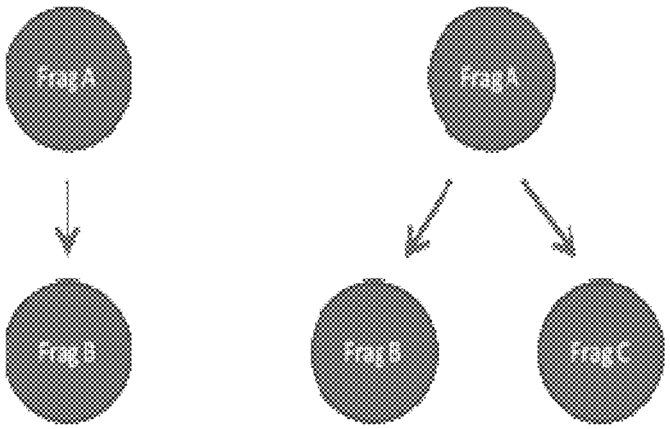
FIG. 6 shows a fragmentation diagram to illustrate an aspect of the present invention.

Method of Utilizing Multiple Energy Libraries to Automate Fragmentation Pathway Construction Because detailed information of how each fragment changes as a function of energy is known, an automated process may be conducted to discover, as a function of increasing energy, how each fragment rate of consumption (disappearance) matches other fragments' rate of creation (appearance). These could be done by simple matching the negative slope of an energy extracted fragment to the positive slope of one or more (in that case the slopes are added) other fragments. In other words, looking for anti-correlation of two or more than two curves at a time, as shown in FIG. 6. The two cases previously mentioned are depicted schematically in the figure.

Figure 7:
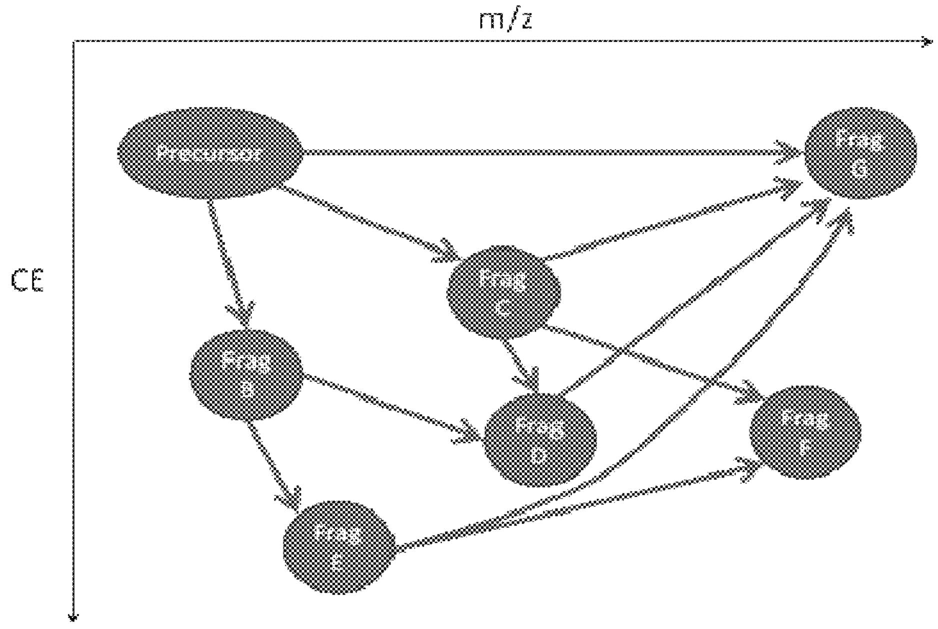
FIG. 7 depicts a schematic representation of part of a possible fragmentation map.

With the added resolution in the collision energy scale and the higher signal to noise ratio of the library, reconstruction of structures is possible without prior knowledge of the fragmentation pathway of the precursor, by starting from collision energy (e.g., =0V) and progressing to lower fragments as the energy increases. FIG. 7, depicts a schematic representation of part of a possible fragmentation map.

Figure 8:
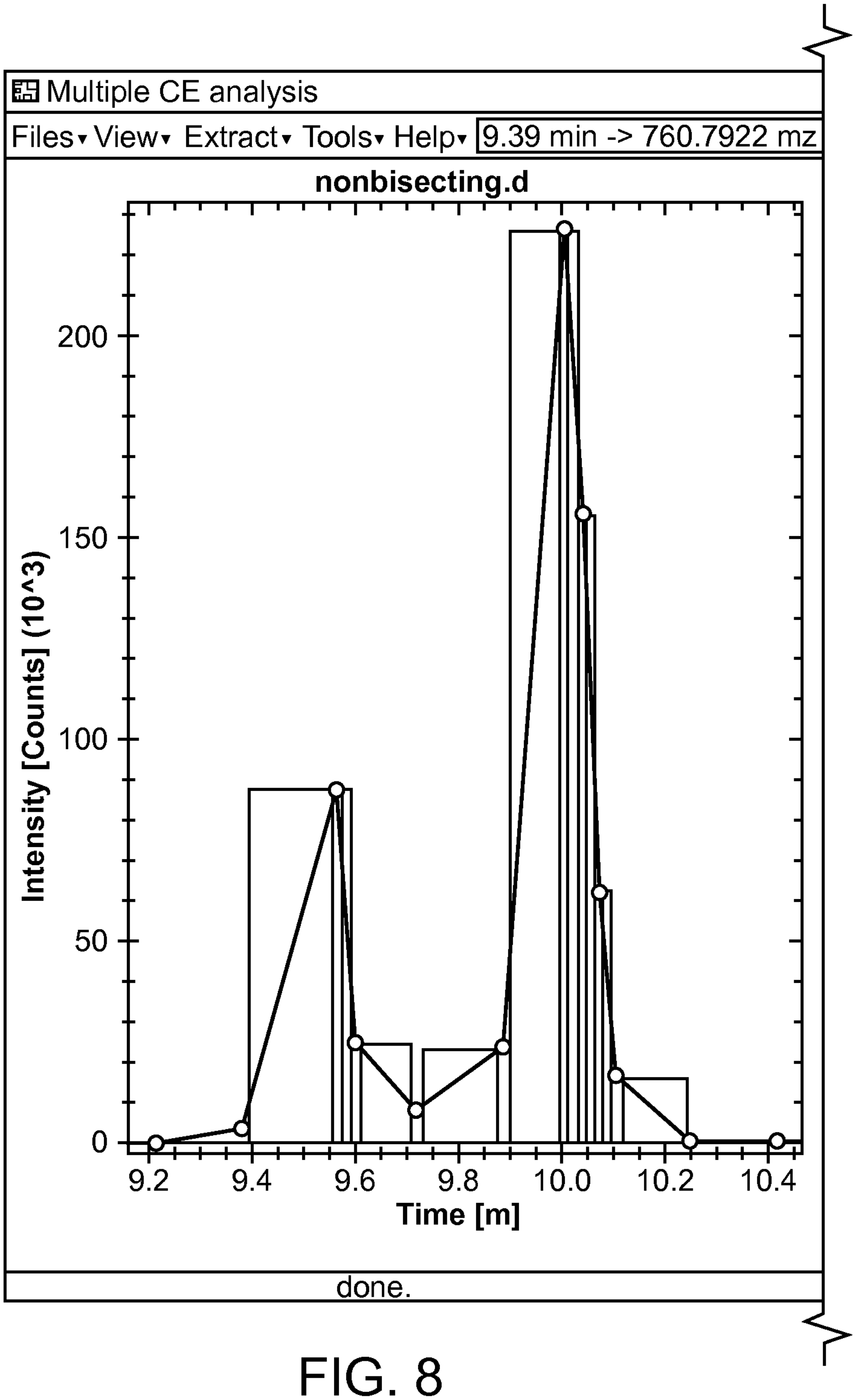
FIG. 8 shows a window of a software tool, in accordance with one embodiment presented. Sheet 1: Precursor extraction pane displaying all multiple collision energy acquisitions of a particular precursor, the one highlighted in red has been selected by the user. Sheet 2 (top): Spectral pane for displaying MS/MS cans as a function of CE, comparing scans from different isomers, displaying metadata and extracting fragments as a function of CE. Sheet 2 (bottom): Fragment extraction pane, displaying the evolution of fragments as a function of CE.
Figure 8:
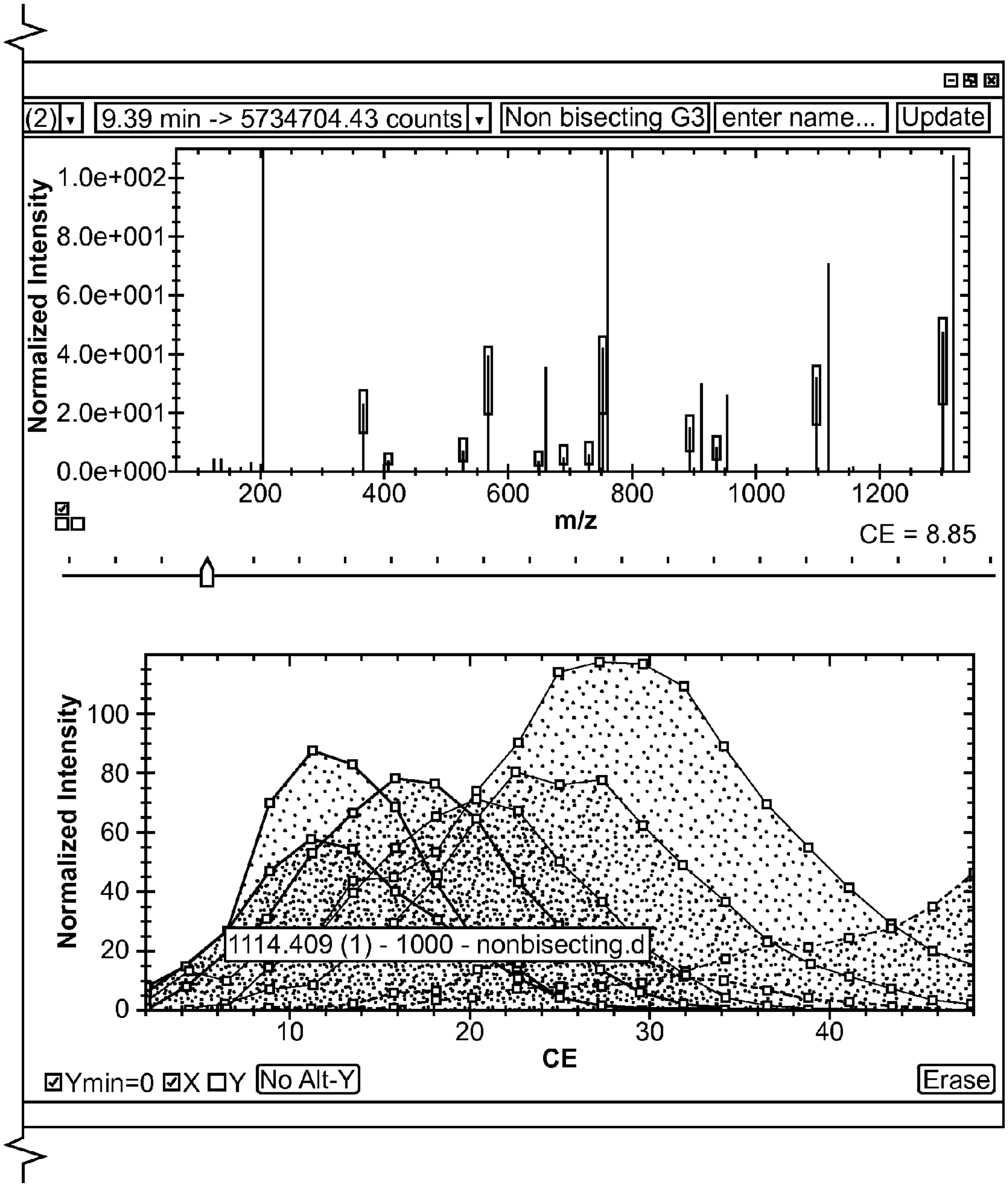

In one embodiment, a software tool can be employed to perform one or more operations of the present invention. FIG. 8 shows a window of a software tool in accordance with one embodiment presented. In one embodiment, the format of each entry in the library (one file corresponds to one isomer) consists of a plain ASCII file (which will be transformed into XML) containing information in a fragment-centric (as opposed to spectrum-centric) way. Information includes: (1) a header; (2) retention times of every measurement used to generate the file; and (3) whether stringency criteria for fragment selection was applied.

A header includes the following information: (1) a time stamp for the generation of the mCE data file; (2) the original file used to extract the data, or the different files used to average the extracted data, or the different mCE data files used to generate the current mCE data file; (3) mass error (in ppm) tolerance and other parameters used for extracting spectra from the original file. Additional information may include: a tag that serves as an internal name to identify the compound to which the mCE file refers; the version of the mCE data file format; precursor m/z value; energies used during multiple collision energy acquisition; number of fragments (N); and N consecutive lines. The N consecutive lines further include the following information for each fragment: charge; for each energy: m/z measured at that energy, normalized counts at that energy, and standard deviation of the counts (if only one measurement, value is zero).

The ion-centric nature of the format allows for efficient scoring schemes when selecting ions and energies for inclusion lists in tandem mass spectrometers (e.g., for selecting transitions for downstream QQQ experiments).

Example of Discrimination Power of a Fragment

In one embodiment, given a family of isomers, the present systems and methods select one as a target and calculate the set of n most discriminant (m/z fragment/energy) pairs between the target isomer and the rest of the isomers.

Assuming there are scans at N energies Ei, with i=1, . . . , N, and comparing isomer j, with j=1, . . . , M against the target isomer (total of M+1 isomers).

First, a set of all fragments common to all M+1 isomers are built, within a specified m/z tolerance. The common fragments inclusively are generated (largest common denominator), i.e. if the fragment exists in at least one of the M+1 isomers, it is considered a valid common fragment, which is referred to as "fragment" from now on. Further, "mz" is used instead of "m/z" for economy of notation. Let mzf be a particular fragment f, with f=1, F; where F is the total number of fragments. Note that according to our definition, mzf of a particular isomer could have zero intensity, since it is a true fragment, but exists in one or more of the other isomers.

Discriminant of a Single Fragment at a Given Energy Between the Target and an Isomer The discrimination power of a single fragment is defined as mzf at a given energy Ei between the target isomer and isomer j, $D^1_{mzf,Ei}[j]$, by equation Eq (1.1).

$$D^1 mz_f, E_i[j] = \frac{ABS[C^j mz_f E_i - C mz_f E_i]}{\sigma^j mz_f E_i + \sigma mz_f, E_i} \times \text{Min}(\varphi^j(E_i), \varphi(E_i)) \quad \text{Eq. (1.1)}$$

$j = 1, \ldots, M$(other isomer's index)
$i = 1, \ldots, N$(index of energy scans)
$f = 1, \ldots,$
$F$(index of each fragment) ≡ maximum common set where $D^1$ is the discrimination power ("discriminant") of a single fragment, $mz_f$, at a given energy, $E_i$. The discrimination hereby refers to distinguishing only the target isomer from isomer j, irrespective of how many isomers exist in the isomer family. Super index 1 denotes that only one fragment is used; m is the mass of the fragment; z is the charge of the fragment; f is the index of the fragment; E is the fragmentation energy; i is the index of the energy; j is the index of the isomer against which the target isomer is being compared to; ABS is the absolute value; C is the normalized counts; σ is the standard deviation of the normalized counts across measurements (this could be experimental or theoretically derived from the absolute intensity of the fragment); ϕ is a function that measures the local quality of the fragment trace (or chromatogram) as a function of the energy. Local quality refers to smoothness.

Figure 9:
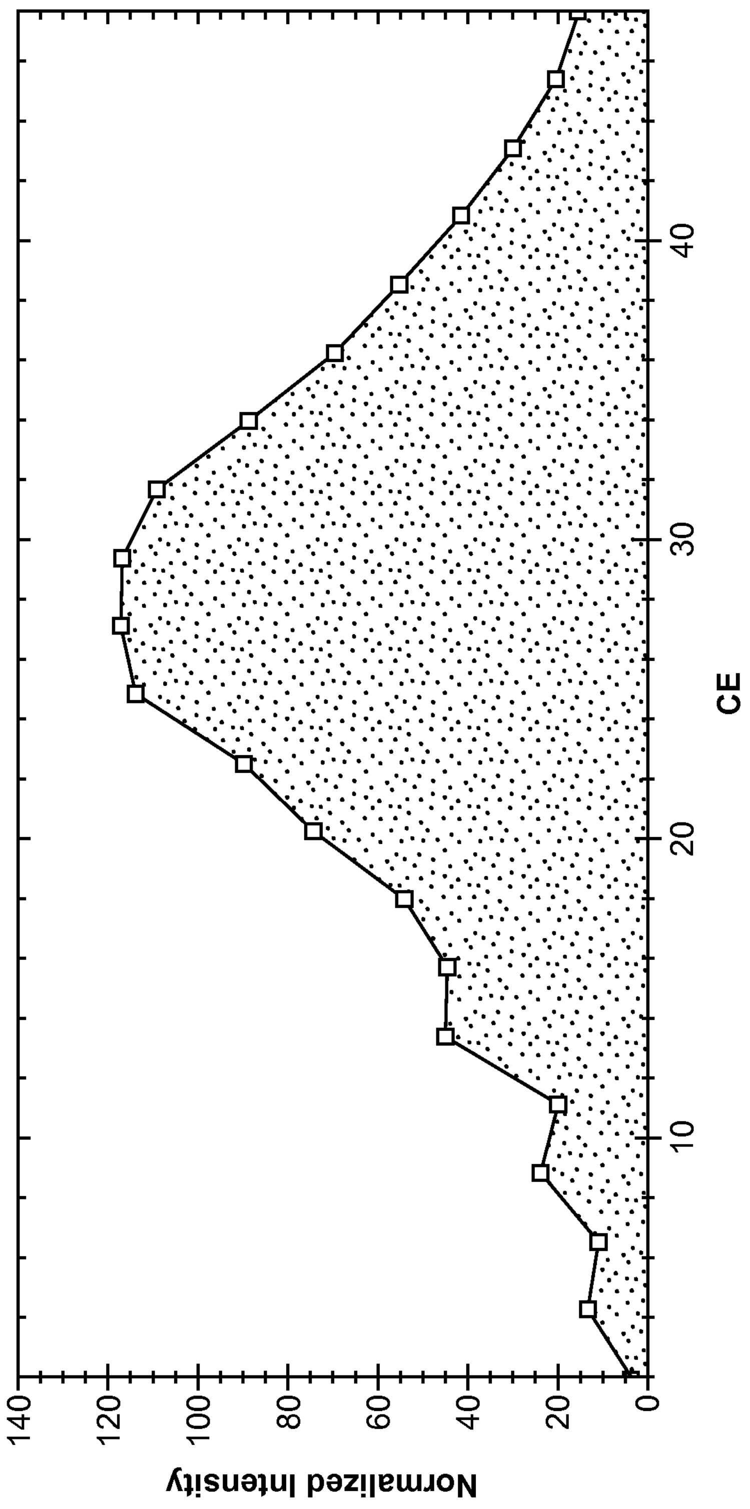
FIG. 9 shows a chart of local quality. Local quality $q(E_i)$ will be low around $E_i$=8.85V and will be 1 at higher energies. Local quality is useful to use in measurements without replicates, because while a conservative estimate of the standard deviation is used, it could still underestimate the real noise.

The first term in Eq (1.1) is the absolute difference between the counts (intensities) of fragment mzf in both isomers. To consider the statistical significance of this difference, it is divided by the standard deviation of the fragment intensity in both target isomer and isomer j (reproducibility of the measurement). The standard deviation can be calculated from experimentally measured intensities. If such measured intensities are not available, a nominal value can be used, as mentioned before (multiple collision energy library section), or the standard deviation may be estimated from ion statistics using the absolute intensity of the product ions. Furthermore, the discrimination power is modulated by a measure of the local quality of the fragment trace as a function of the energy. Quality is a number between 0 (very poor quality trace) and 1 (good trace). It penalizes $D^1_{mzf,Ei}[j]$ based on the number of up-down fluctuations of the fragment intensity trace as a function of the energy and how big the fluctuations are compared to the value of the intensity at that energy. The measure is calculated in a 5 energy interval window centered on Ei but larger intervals may be defined, too. One fluctuation is subtracted to the fluctuation count because of the possibility of encountering the apex of a fragment's intensity trace. FIG. 9 shows local quality q(Ei).

Discriminant of a Fragment at a Given Energy

The discriminant of a fragment mzf at energy Ei, $D^1_{mzf,Ei}$, is obtained by minimizing $D^1_{mzf,Ei}[j]$ with respect to all isomers j, as indicated in equation Eq (1.2). This means that if fragment f=3 (a non-existent ion in the spectrum of the target isomer) is the most discriminant fragment among the three fragments of the target isomer at energy Ei.

Optimal Discriminant Fragment/Energy Pair

The optimal (mzf*, Ei*) pair is calculated as the pair that maximizes $D^1_{mzf,Ei}$ with respect to all the combinations {f, i} of possible fragments and energies (Equation Eq (1.3)).

$E_i f{=}1 f{=}2 f{=}3$ $$D^1 mz_f, E_i = \underset{\{j\}}{\text{Min}}(D^1 mz_f, E_i) \quad \text{Eq. (1.2)}$$

where $D^1$ is the discrimination power ("discriminant") of a single fragment, $(m/z)_f$, at a given energy, $E_i$, the discrimination hereby refers to distinguishing the target isomer from the rest of the isomers in the family; m is the mass of the fragment; z is the charge of the fragment; f is the index of the fragment; E is the fragmentation energy; i is the index of the energy; j is the index of the isomer against which the target isomer is being compared to $$(mz_{f*}, E_{i*}) \text{ such } D^1 mz_{f*}, E_{i*} = \underset{\{f,i\}}{\text{Max}}(D^1 z_f, E_i) \quad \text{Eq. (1.3)}$$

where $D^1$ is the optima/discrimination power ("discriminant") of a single fragment, $(m/z)_f$, at a given energy, $E_i$. The discrimination hereby refers to distinguishing the target isomer from the rest of the isomers in the family; m is the mass of the fragment; z is the charge of the fragment; f is the index of the fragment; E is the fragmentation energy; i is the index of the energy; j is the index of the isomer against which the target isomer is being compared to; $(mz_{f*}, E_{i*})$ is the optimal discriminant fragment/energy pair.

Optimal Discriminant Sets of Fragment/Energy Pairs

The above definitions can be extended to two (fragment/energy) pairs, D2(mzf1,Ei1)(mzf2,Ei2), based on the single discriminant, $D^1_{mfz,Ei}$, as shown in equation Eq (2.1). The two optimal pairs (mzf1*, Ei1*)(mzf2*, Ei2*) can then be found by maximizing D2(mzf1,Ei1)(mzf2,Ei2) with respect to all possible combinations of {f1, i1, f2, i1}, as shown in Eq (2.2).

The power of using this discriminant can be seen given two energies, Ei1 and Ei2, fragments F11 and F23 are the most discriminant pair, although none of them is a unique ion of the target isomer MS/MS spectrum or has a large intensity compared to other fragments.

$$D^2(mz_{f1}, E_{i1})(mz_{f2}, E_{i2}) = \underset{\{j\}}{\text{Min}}(D^1 mz_{f1}, E_{i1}[j] + D^1 mz_{f2}, E_{i2}[j]) \quad \text{Eq. (2.1)}$$

where $D^2$ is the discrimination power ("discriminant") of a two fragments, $(m/z)_{f1}$ and $(m/z)_{f2}$, at their two corresponding energies, $E_{i1}$ and $E_{i2}$, the discrimination hereby refers to distinguishing the target isomer from isomer j; m is the mass of the fragment; z is the charge of the fragment; $f_1$ and $f_2$ are the indexes of the fragments; $E_1$ and $E_2$ are the fragmentation energies of fragments $f_1$ and $f_2$; i is the index of the energy; j is the index of the isomer against which the target isomer is being compared to; $D^1 mz_{f1}, E_{i1}$ is as described in Eq. 1.1.

Eq. (2.2)

$(mz_{f1*}, E_{i1*})(mz_{f2*}, E_{i2*})$ such that $$D^2(mz_{f1*}, E_{i1*})(mz_{f2*}, E_{i2*}) = \underset{\begin{Bmatrix} f_1, f_2 \\ i_1, i_2 \end{Bmatrix}}{\text{Max}} (mz_{f1}, E_{i1})(mz_{f2}, E_{i2})$$

where m is the mass of a fragment; z is the charge of a fragment; f is the index of the fragment; E is the fragmentation energy; i is the index of the energy; $D^2$ is in Eq. 2.1; $D^2(mz_{f1*}, E_{i1*})(mz_{f2*}, E_{i2*})$ is the optimal (highest) value of $D^2$; $(mz_{f1*}, E_{i1*})$ $(mz_{f2*}, E_{i2*})$ are two energy pair values that optimize $D^2$ Notice that calculating the combinations described above for a set of only F=100 fragments and N=17 energy levels involves performing 100*17*100*17 calculations; this is almost 3 million calculations and is feasible as a real time calculation using current processors.

The same generalization used to go from one set to two sets of (mzf, Ei) pairs can be used to go to three sets, as shown in equations Eq (3.1) and Eq (3.2). But now, finding the optimal 3 (fragment/energy) pairs requires 100*17*100*17*100*17 calculations, which is too time consuming for real calculations in a standard personal computer. To avoid this problem forward selection is used.

$$D^3(mz_{f1}, E_{i1})(mz_{f2}, E_{i2})(mz_{f3}, E_{i3}) = \underset{\{j\}}{\mathrm{Min}}(D^1 mz_{f1}m, E_{i1}[j] + D^1 mz_{f2}m, E_{i2}[j] + D^1 mz_{f3}m, E_{i3}[j] \quad \text{Eq. (3.1)}$$

where $D^3$ is the discrimination power ("discriminant") of a three fragments, $(m/z)_{f1}$, $(m/z)_{f2}$ and $(m/z)_{f3}$ at their three corresponding energies, $E_{i1}$, $E_{i2}$ and $E_{i3}$. The discrimination hereby refers to distinguishing the target isomer from isomer j; m is the mass of a fragment; z is the charge of a fragment; f is the index of the fragment; E is the fragmentation energy; i is the index of the energy; j is the index of the isomers against which the target isomer is being compared to.

$$(mz_{f1*}, E_{i1*})(mz_{f2*}, E_{i2*})(mz_{f3*}, E_{i3*}) \quad \text{Eq. (3.2)}$$

$$(mz_{f1*}, E_{i1*})(mz_{f2*}, E_{i2*})(mz_{f3*}, E_{i3*}) \text{ such that}$$

$$D^3(mz_{f1*}, E_{i1*})(mz_{f2*}, E_{i2*})(mz_{f3*}, E_{i3*}) = \underset{\left\{\substack{f_1,f_2,f_3 \\ i_1,i_2,i_3}\right\}}{\mathrm{Max}}(D^3(mz_{f1}, E_{i1})(mz_{f2}, E_{i2})(mz_{f3}, E_{i3}))$$

where $D^3(mz_{f1*},E_{i1*})(mz_{f2*},E_{i2*})(mz_{f3*},E_{i3*})$ is the optimal discrimination power ("discriminant") of a three fragments, $(m/z)_{f1}$, $(m/z)_{f2}$ and $(m/z)_{f3}$ at their three corresponding energies, $E_{i1}$, $E_{i2}$ and $E_{i3}$. The discrimination hereby refers to distinguishing the target isomer from isomer j; m is the mass of a fragment; z is the charge of a fragment; f is the index of the fragment; E is the fragmentation energy; i is the index of the energy; $(mz_{f1*},E_{i1*})(mz_{f2*},E_{i2*})(mz_{f3*},E_{i3*})$ are three energy pair values that optimize $D^3$.

Method for Overcoming Computational Limits for Optimal Discriminant Fragment Selection for Isomer ID by Forward Selection

QQQ

Forward selection can overcome the computational load of selecting large sets of discriminatory (mzf, Ei) pairs. Start by calculating, as previously described, a set of S optimal fragment/energy pairs, (mzfs*, Eis*) . . . (mzf1*, Ei1*), by maximizing DS(mzfs, Eis) . . . (mzf1, Ei1). Now define the discriminant of S+1 pairs as in Eq (4.1). Note that the second term in the summation of the right hand side of Eq (4.1) is similar to the right hand side of Eq (3.1), but it applies to a set of S pairs, is evaluated at the optimal fragment/energies of those pairs, and is evaluated for isomer j. Finding optimal pairs is similar to the previous cases, with the maximize only with respect to the {f(s+1), is+1} indexes on fragments and energy, as shown in Eq (4.2).

$$D^{(s+1)}(mz_{fs+1},E_{is})(mz_{fs*},E_{is*}) \ldots (mz_{f1*},E_{i1*}) = \mathrm{Min}\{D^1[j]mz_{fs+1},E_{is+1} + D^s[j](mz_{fs*},E_{is*}) \ldots (mz_{f1*},E_{i1*})\} \quad \text{Eq. (4.1)}$$

where $D^{(s+1)}$ is the discrimination power of s+1 fragment-energy pairs to differentiate a target isomer form isomer j; $D^s$s is the discrimination power of s fragment-energy pairs to differentiate a target isomer form isomer j; $D^1$ is as in Eq 1.1; m is the mass of a fragment; z is the charge of a fragment; f is the index of the fragment; E is the fragmentation energy; i is the index of the energy; j is the index of the isomers against which the target isomer is being compared to.

$$(mz_{fs+1*}, E_{is+1*}) \text{ such that} \quad \text{Eq. (4.2)}$$

$$\vdots$$

$$(mz_{f1*}, E_{i1*})D^{s+1}(mz_{f3+1*}, E_{i2+1*}) \ldots (mz_{f1*}, E_{i1*}) = \underset{\{mz_{fs+1},E_{is+1}\}}{\mathrm{Max}D^{s+1}}(mz_{fs+1}, E_{is+1})(mz_{fs*}, E_{is*}) \ldots (mz_{f1*}, E_{i1*})$$

where m is the mass of a fragment; z is the charge of a fragment; f is the index of the fragment; E is the fragmentation energy; i is the index of the energy; s+1 is the number of fragments being considered; * is the optimal value of a particular fragment energy pair; $D^{s+1}$D is the same as in Eq. 4.1.

Figure 10:
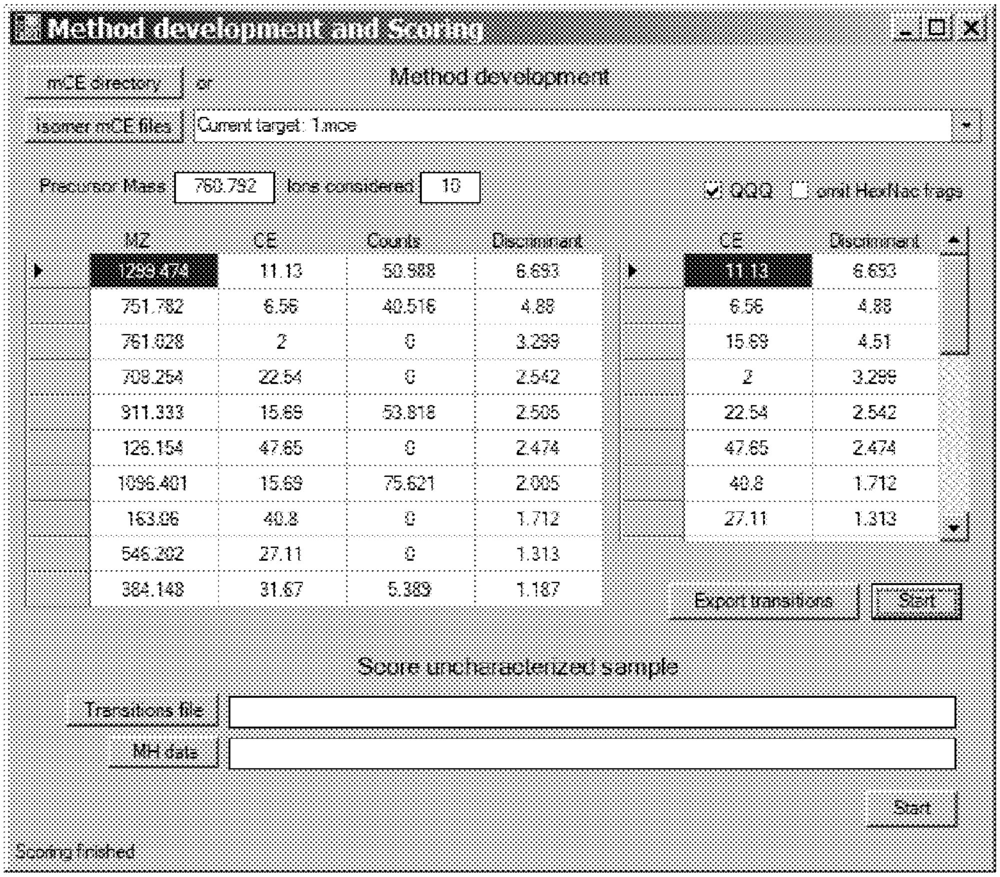
FIG. 10 is a screenshot of a software tool, in accordance with one embodiment.

FIG. 10 shows forward selection being used to calculate the 10 most discriminant (m/z,CE) pairs (user selected 10 pairs for consideration). Isomers being compared are two anomers of a tri-antennary glycan. Anomer 1 is the target. The software is automated to process full directories of mCE files corresponding to different isomer families.

Left table: (m/z, CE) pairs are ranked by discrimination. Right table: cumulative discriminant at each energy ranked by discrimination; they are obtained by adding discriminant values of each pairs that falls in that energy. Notice some (m/z, CE) pairs have "0" intensity (or normalized counts) because they are only present in the other anomer. MRM transitions can be directly exported and pasted into the acquisition method of a QQQ instrument.

QTOF

Figure 11:
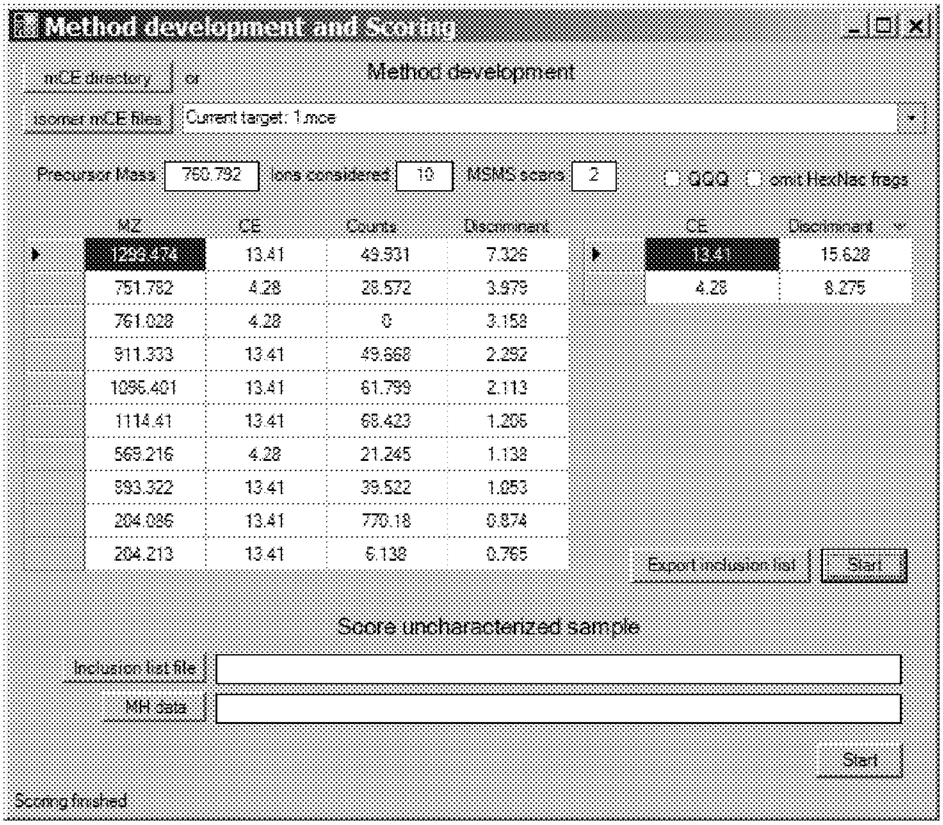
FIG. 11 is a screenshot of a software tool, in accordance with one embodiment.

For a QTOF, the user specifies the number of MS/MS scans that she is willing to take to discriminate one isomer from the rest. A large number of MS/MS scans is more discriminatory (they start to resemble MRM transitions), but they decrease throughput when measuring an uncharacterized sample. In another embodiment, the number of MS/MS scans could be chosen automatically based on how much discrimination each energy achieves (table to the right in FIG. 11).

The same panel as in the previous figure, but now the "QQQ" checkbox is unchecked. User chose 2 MS/MS scans (Notice table to the left has only two CE values).

Assuming that selection is constrained to m MS/MS scans. First generate all combinations of N energies (N is the total number of energy scans) taken by m, as shown above in the equations above equation Eq (5.1). Then simply re-define all optimization equations as operating over the energies of a specific combination, 1, and then maximize with respect to all the combinations. Eq (5.1) shows how to redefine equation Eq (1.3) and equation Eq (5.2) shows how to redefine Eq (2.2). The procedure is straight forward to generalize for other cases, like forward selection.

$$mMS/MS \text{ scans} \qquad \text{Eq. (5.1)}$$

Let "$l$" be the index of a combination $$\text{from } C\binom{N}{m} \longrightarrow \#\text{ energy levels}$$

Redefine equation Eq. (1.3) as $$D^1 mz_{f*}, E_{i*} = \text{Max}(D^1 mz_f, E_i \mid \underbrace{i \in l}_{\substack{\text{Energy } i \text{ belongs} \\ \text{to one of the energies} \\ \text{in combination } l}})$$

where 1 is the index of a combination from $$C\binom{N}{m};$$

C is a combination from $$C\binom{N}{m};$$

N is the total number of energy levels; m is the number of product ion scans or the mass of the fragment, when it refers to mass, it is always written ad mz; D is the same as in Eq. 1.1; z is the charge of a fragment; f is the index of the fragment; E is the fragmentation energy; i is the index of the energy; * is the optimal value of a particular fragment energy pair Similarly for Eq. (2.2)

$$D^2(mz_{f1*}, E_{i1*})(mz_{f2*}, E_{i2*}) = \underset{\substack{\{f_1, f_2\} \\ \{i_1, i_2, l\}}}{\text{Max}} \left( D^2(mz_{f1}, E_{i1})(mz_{f2}, E_{i2}) \,\middle|\, \begin{matrix} i_1 \in l \\ i_2 \in l \end{matrix} \right) \qquad \text{Eq. (5.2)}$$

And so on for $D^{s+1}(\ )\ .\ .\ .\ (\ )$ where $D^2$ is the same as in equation Eq. 2.1; m is the mass of a fragment; z is the charge of a fragment; f is the index of the fragment; E is the fragmentation energy; i is the index of the energy; * is the optimal value of two particular fragment energy pair; 1 is the index of a combination from $$C\binom{N}{m}.$$

Generating Methods for Acquiring Uncharacterized Samples

QQQ

Each set of (mzf, Ei) represent sets of transitions that, together with information from the precursor m/z, can be exported directly from mCE for loading into an acquisition method of a QQQ. Together with the standard fields of MRM lists, information at the end of the line is augmented, consisting of everything needed to score each transition post-acquisition, namely: expected normalized intensity and expected standard deviation of the intensity for each transition. Since a QQQ does not have access to the "largest N" peaks of an MS/MS spectrum, for each transition designed to be acquired in a QQQ a reference transition chosen as the largest fragment in the MS/MS scan is added at the energy associated to the transition. If the most intense fragment does not have a constant intensity value across all isomers, the next fragment in descending order of intensity is chosen, which has the same intensity value across other isomers of the family. The desire is to choose a reference transition that has a high signal/noise to introduce less variability when we use it as a normalization factor of the transitions of interest. What is needed is to add at least one reference transition for each energy value appearing in the MRM transition list being used to acquire an uncharacterized sample. Choosing the same reference transition for all isomers in a family is not strictly necessary, but simplifies calculations when deconvoluting mixtures of isomers in an uncharacterized sample (explained in the subsequent section). An example of a list that contains 3 transitions to distinguish the two anomers of the previously mentioned tri-antennary glycan is shown below:

| Compound Name | ISTD? | Precursor Ion | MSI Res | Product Ion | MS2 Res | Fragmentor | Collision Energy | Cell Accerator Voltage | Ret Time (min) | Delta Ret Time | PolarityMy Name | | |
|---|---|---|---|---|---|---|---|---|---|---|---|---|---|
| nonbisecting.9.39min.mce | FALSE | 761 | Unit | 1299 | Unit | 135 | 11.13 | 0 | 0 | 0 | Positiveaverage | 381.271 | 12.695 |
| nonbisecting.9.39min.mce | FALSE | 761 | Unit | 204 | Unit | 135 | 11.13 | 0 | 0 | 0 | Positiveaverage.reference | 4968.76157.324 | |
| nonbisecting.9.39min.mce | FALSE | 761 | Unit | 752 | Unit | 135 | 6.56 | 0 | 0 | 0 | Positiveaverage | 374.375 | 55.477 |
| nonbisecting.9.39min.mce | FALSE | 761 | Unit | 761 | Unit | 135 | 6.56 | 0 | 0 | 0 | Positiveaverage.reference | 4192.761145.459 | |
| nonbisecting.9.39min.mce | FALSE | 761 | Unit | 1096 | Unit | 135 | 15.69 | 0 | 0 | 0 | Positiveaverage | 531.791 | 46.078 |
| nonbisecting.9.39min.mce | FALSE | 761 | Unit | 204 | Unit | 135 | 15.69 | 0 | 0 | 0 | Positiveaverage.reference | 5067.240225.605 | |
| nonbisecting.9.89min.mce | FALSE | 761 | Unit | 1299 | Unit | 135 | 11.13 | 0 | 0 | 0 | Positiveaverage | 40.755 | 22.263 |
| nonbisecting.9.89min.mce | FALSE | 761 | Unit | 204 | Unit | 135 | 11.13 | 0 | 0 | 0 | Positiveaverage.reference | 5056.54268.903 | |
| nonbisecting.9.89min.mce | FALSE | 761 | Unit | 1096 | Unit | 135 | 15.69 | 0 | 0 | 0 | Positiveaverage | 253.232 | 34.951 |
| nonbisecting.9.89min.mce | FALSE | 761 | Unit | 204 | Unit | 135 | 15.69 | 0 | 0 | 0 | Positiveaverage.reference | 5395.101133.909 | |

-continued

| | | | | | | | | | | |
|---|---|---|---|---|---|---|---|---|---|---|
| nonbisecting.9.89min.mce | FALSE | 761 | Unit | 1155 | Unit | 135 | 6.56 | 0 | 0 | 0 |
| Positiveaverage | 21.685 | 7.150 | | | | | | | | |
| nonbisecting.9.89min.mce | FALSE | 761 | Unit | 761 | Unit | 135 | 6.56 | 0 | 0 | 0 |
| Positiveaverage.reference | | | 4303.947107.647 | | | | | | | |

Every field after "Positive" is an augmented field used for scoring isomers. Aside from the header, there are 12 rows (each split into 2 lines), 6 rows to score the first isomer and 6 rows for the second. From the 6 rows of each isomer, 3 are measurements of the discriminating fragment and 3 are reference fragments to correctly normalize the experimental signal before scoring it.

QTOF

Lists generated for QTOFs are similar, but since they will generate MS/MS scans, no reference scans are needed. The following lists shows a typical preferred inclusion lists selected to differentiate the anomers with one MS/MS scan and the two best scoring ions. Everything after CE=16.630 is augmented information used for scoring.

```
=
AutoPreferredExcludeMSMSTable
On,Prec. m/z, Delta m/z (ppm),Z,Prec. Type,Ret. time (min),Delta ret.
time (min),Iso. width,Collision energy
True,812.814,180,2,1,0,,Medium (~4 m/z),16.630, |C:\Documents and
Settings\jsatulov\Desktop\ASMS\32.2.mce|366.137:623.718:0.000|
366.137:304.96:0.000|204.084:251.461:0.080|204.0
84:619:0.000|
```

Scoring Isomers

The MRM transitions/inclusion lists are used to acquire transitions/scans of a sample of unknown isomeric composition using a QQQ/QTOF. The acquisition is targeted, in only identifying isomers that were included for identifications in lists generated by mCE (isomers that have been characterized by multiple collision energies and have been used to generate the method).

Scoring MRM transitions is identical to scoring fragments from QTOF MS/MS scans; the only difference is the initial intensity normalization step of the experimental data, as mentioned in the previous section. For pedagogical purposes, it is assumed that, either from MRM transitions or from MS/MS scans, recovered, for a specific isomer, k, a set of experimentally measured normalized intensities, Cexpmzf,Ei and predicted (or expected) normalized intensities, Ckmzf,Ei, each one corresponding to a (mzf, Ei) discriminant pair of that isomer. The difference among the intensities of experimental and expected values are defined and a the score of each (mzf, Ei) pair according to the two equations above Eq (6.1). The score measures whether, within the expected variability of the signal, the experimental intensity can be explained by the intensity of a product ion of isomer k. The score value ranges from 0 (unexplained measured value) to 1 (perfect match.)

The score of isomer k, Eq (6.1), is constructed as a weighted sum of all individual (mzf, Ei) pairs used to discriminate isomer k. The weight factor (last term on the right hand side of Eq (6.1)) favors (mzf, Ei) pairs with a high signal/noise ratio (high reproducibility, weight close to 1) in favor of less reproducible pairs (□kmzf,Ei similar in value to Ckmzf,Ei, weight close to 0). The weight factor is correlated to the discrimination power of an (mzf, Ei) pair ("Discriminant" column in the right hand side table of the previous two figures). In another embodiment, the discriminant of the (mzf, Ei) pair is used as a weighting factor to add up the PKp*score terms of Eq (6.1).

The score of the isomer may be further normalized to the total number of (mzf, Ei) pairs (number of terms in the sum) in order to make it a number between zero and one.

Eq. (6.1)

$$\text{Given isomer } k\ \&(mz_{f*}, E_{i*}) = p*$$

$$\text{define } diff^k_{p*} = \text{ABS}(C^k_{p*} - C^{exp}_{p*})$$

$$p^k_{p*score} = \left\{ \frac{\sigma^k_{p*} - diff^k_{p*}}{0\sigma^k_{p*}} \text{ if } \sigma^k_{p*} > diff^k_{p*} C^{exp}_{p*} = \text{normalized experimentally measured intensity} \right\}$$

$$\text{otherwise}$$

$$Score^k = \sum Pscore^k_{p*} \times \frac{(C^k_{p*} - \sigma^k_{p*})}{C^k_{p*}}$$

where k is the index of the isomer being scored; m is the mass of a fragment; z is the charge of a fragment; f is the index of the fragment; E is the fragmentation energy; i is the index of the energy; p is an abbreviation to denote an optimal fragment energy pair: ($mz_{f*}$,$E_{i*}$); * is an abbreviation to denote an optimal fragment and energy ($mz_f$,$E_i$); ABS is the absolute value; exp is the experimentally measured value; σ is the standard deviation of the normalized counts across measurements (this could be experimental or theoretically derived from the absolute intensity of the fragment)

G1 isomers from a mAb: A QTOF method generated by mCE with 4 most discriminant ions and 1 MS/MS scan to discriminate the first and second peak of the G1 structure was generated by mCE and imported in a QTOF as a preferred inclusion list. The list was used for acquiring an uncharacterized sample of glycans released from a mAb. The appearance of the precursor ion from the inclusion list (m/z=812.82) triggered 3 MS/MS scans. Post-acquisition scoring of the MS/MS scans identified the correct isomers.

Figure 12:
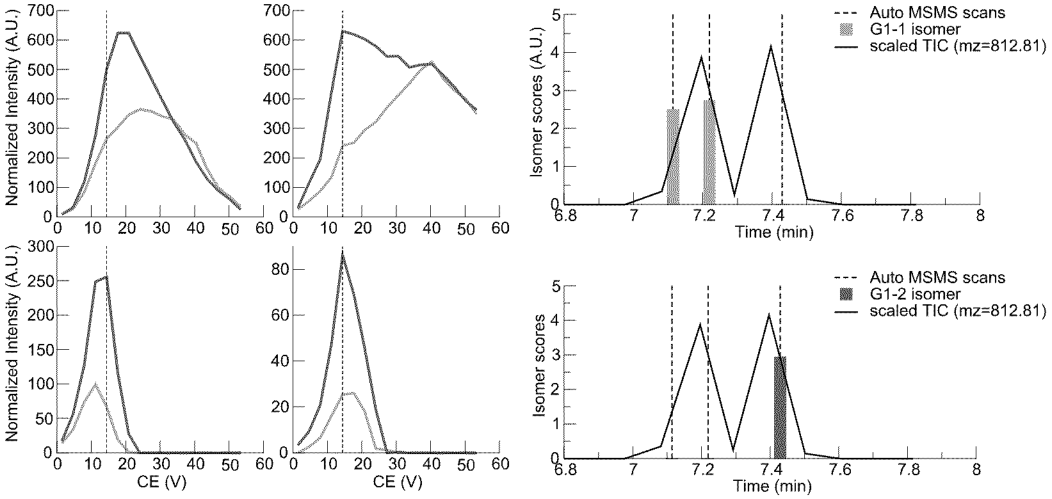
FIG. 12 shows example results.

In FIG. 12, the left panels show the four most discriminant ions and CE (----) selected, from top-left to bottom-right fragments m/z are: 366.137, 204.084, 803.807, and 1403.52. Orange curves are fragments from first isomer, green from second. Right panels: scoring results for mAb sample; dashed lines indicate times where MS/MS scans were triggered.

Tri-antennary glycan anomers: A similar protocol was applied using .mce files of anomers of a tri-antennary glycan, 2 most intense ions and 1 MS/MS were used for discriminant fragment selection.

Figure 13:
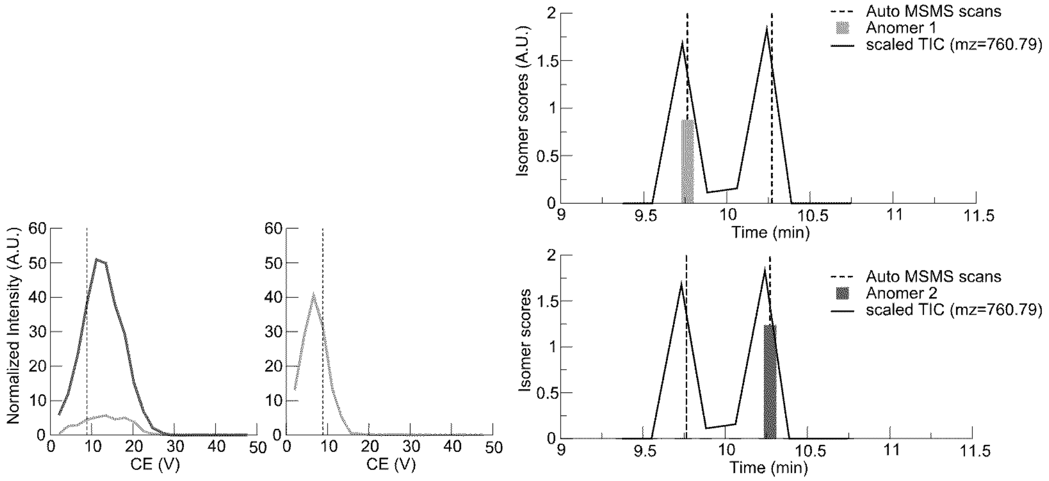
FIG. 13 shows example results.
Figure 14:
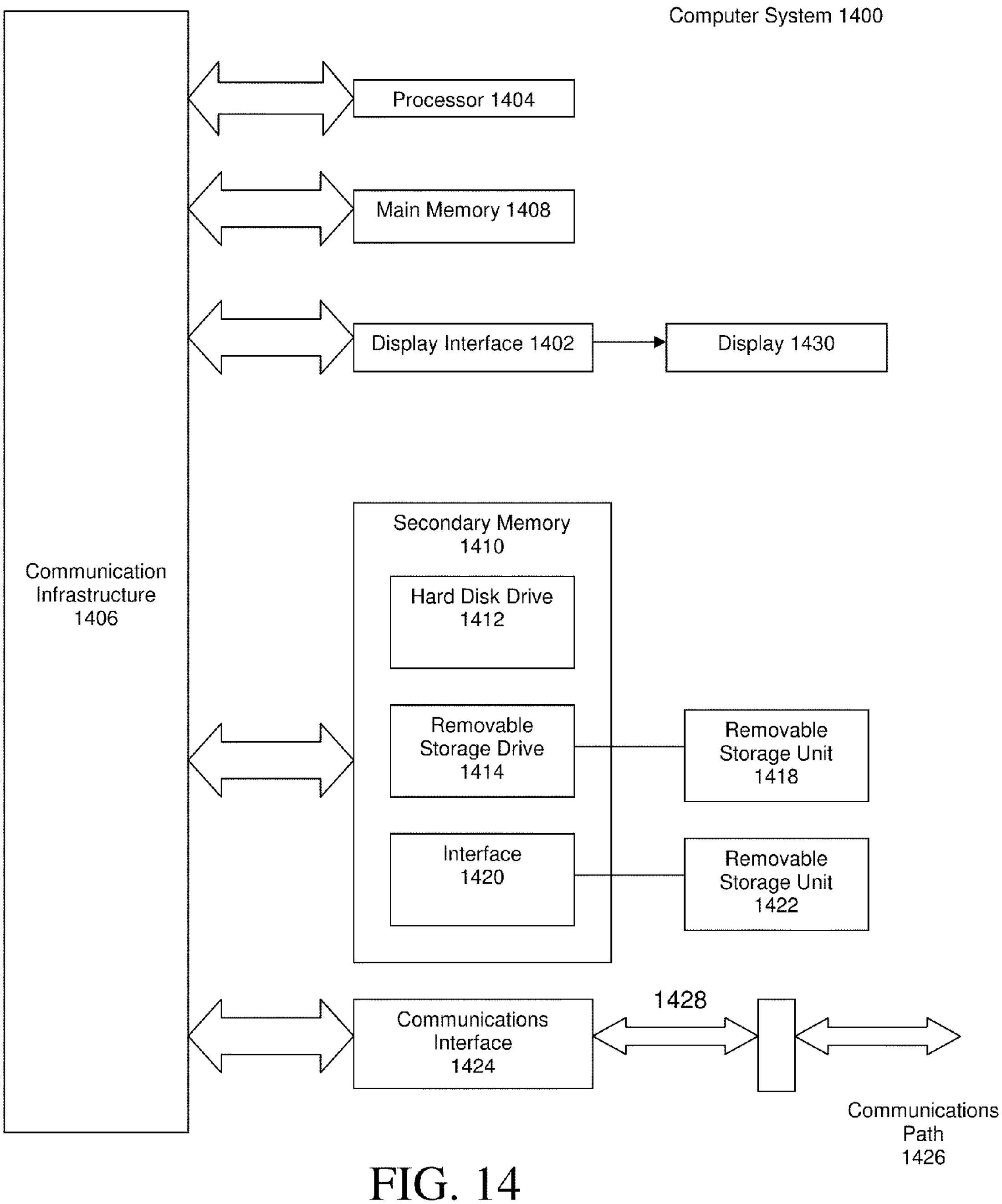
FIG. 14 is a schematic illustration of a computer system for carrying out the methods described herein.

In FIG. 13, left panels show two most discriminant ions (second is a unique fragment) and CE (---) calculated by mCE; m/z values of fragments are: 1299.47 and 751.782. Right panels: scoring results from MS/MS scans; dashed lines indicate times where MS/MS scans were triggered.

Determining isomer ratios in isomer mixtures

If isomers are chromatographically unresolved, that is the MS/MS (or MRM transition) measured results from the fragmentation of two isomers, the score of any particular isomer will not be as high as it could be. More importantly, more than one isomer will have non-negligible scores.

An advantage of the present invention is that the relative amounts of each isomer present at the time of the measurement can be determined. Notice this relative quantification is done within isomers of an isomer family and not between different families (different precursor m/z values).

2-Isomer Family

For pedagogical purposes start with the case of an isomer family composed of two isomers. Assume that experimental signals from the isomers are additive, and define a composite normalized intensity of an expected ($mz_f$, $E_i$) pair as a linear combination of the isomers in the family, as shown in Eq (6.2). We are assuming equal ionization efficiency for each isomer; if this is not the case, the linear combination hereby described can be weighted according to the calibration curves of each isomer. Notice performing linear combinations of fragments intensities that are normalized, but they are normalized by the same number, so the linear combination is normalized, too. Coefficients $r_a$ and $r_b$ add up to 1, since they represent relative contributions of each isomer to the observed signal. Also perform a linear combination of the standard deviation. Once the combined intensity and standard deviation are defined, one can normalize and score the experimentally measured fragments exactly as done before (experimental fragments are normalized exactly as in the previous section). This is shown in the equation preceding Eq (6.3). Now, however, the value of the Isomer Score is a function of $r_a$ and $r_b$. To find the actual values, $r^*_a$ and $r^*_b$, simply maximize the Isomer Score. Since this optimization is constrained, this is equivalent to a one dimensional optimization. The values of $r_a$ and $r_b$ may be treated as either discrete or continuous for the optimization.

Eq. (6.2)

$$\left\{\begin{array}{c} C_{p*}(r_a, r_b) = r_a C^a_{p*} + r_b C^b_{p*},\ r_a + r_b = 1 \\ \sigma_{p*}(r_a, r_b) = r_a \sigma^a_{p*} + r_b \sigma^b_{p*} \end{array}\right\}$$

$$diff^{(r_a,r_b)}_{p*},\quad Pscore^{(r_a,r_b)}_{p*} \text{ using } C^{(r_a,r_b)}_{p*},\ \sigma^{(r_a,r_b)}_{p*}$$

$$Isom\ \text{Score}\ (r_a, r_b) = \sum_{\{p*\}} Pscore^{(r_a,r_b)}_{p*} \times \frac{\left(C^{(r_a,r_b)}_{p*} - \sigma^{(r_a,r_b)}_{p*}\right)}{C^{(r_a,r_b)}_{p*}}$$

where m is the mass of a fragment; z is the charge of a fragment; f is the index of the fragment; E is the fragmentation energy; i is the index of the energy; p is an abbreviation to denote an optimal fragment energy pair: ($mz_{f*}$,$E_{i*}$); * is an abbreviation to denote an optimal fragment and energy ($mz_f$, $E_i$); σ is the standard deviation of the normalized counts across measurements (this could be experimental or theoretically derived from the absolute intensity of the fragment); C is the normalized counts (also referred to as normalized intensity in the description); r is a coefficient denoting the percentage of isomer A and isomer B in the sample; a is an index referring to magnitudes associate to isomer A; b is an index referring to magnitudes associate to isomer B.

Eq. (6.3)

$$\begin{matrix} r^*_a \\ r^*_b \end{matrix} \text{ such that } Isom\ \text{Score}(r^*_a, r^*_b) =$$

-continued $$\underset{\{r_a,r_b\}}{\text{Max}}(Isom\ \text{Score}\ (r_a, r_b)\,|\,r_a + r_b = 1)$$

$$(r^*_a, r^*_b) \equiv \text{isomer ratio}$$

where r is a coefficient denoting the percentage of isomer A and isomer B in the sample; a is an index referring to magnitudes associate to isomer A; b is an index referring to magnitudes associate to isomer B; * is an abbreviation to denote an optimal value for the percentage of isomer A and isomer B.

n-Isomer Family

For n isomers (n>2), equations generalize in a very straightforward way. Eq (6.4) and Eq (6.5) demonstrate how to construct the expected mixed signal of n isomers and how to find their final ratios. As before, $r_1 \ldots r_n$ may be discredited or treated as continuous variables.

When resolving mixtures of n isomers, at least (n−1) discriminant ($mz_f$, $E_i$) pairs can be used. Otherwise, the optimization of n−1 variables carried out in Eq (6.5) may be ill posed.

$$\begin{array}{l} C_{p*}(r_1 \ldots r_n) = r_1 C^{a1}_{p*} + \ldots + r_n C^{an}_{p*} \\ \qquad\qquad\qquad\qquad r_1 + \ldots + r_n = 1 \\ \sigma_{p*}(r_1 \ldots r_n) = r_1 \sigma^{a2}_{p*} + \ldots + r_n \sigma^{an}_{p*} \end{array} \qquad \text{Eq. (6.4)}$$

as before define diff, Pscore & Isom, Score ($r_1, \ldots, r_n$) where C is the normalized counts (also referred to as normalized intensity in the description); p is an abbreviation to denote an optimal fragment energy pair: ($mz_{f*}$,$E_{i*}$); * is an abbreviation to denote an optimal fragment and energy ($mz_f$,$E_i$); r is a coefficient denoting the percentage of isomers $A_1$ through $A_n$ in the sample; n is the total number of isomers being considered; $a_t$ is an index referring to magnitudes associated to isomer t; σ is the standard deviation of the normalized counts.

Eq. (6.5)

$$(r^*_1, \ldots, r^*_n) \text{ such that}$$

$$Isom\ \text{Score}(r^*_1, \ldots, r^*_n) =$$

$$\underset{\{r_1,r_2,\ldots,r_n\}}{\text{Max}}(Isom\ \text{Score}(r_1 \ldots r_n)\,|\,r_1 + \ldots + r_n = 1)$$

$$(r^*_1, \ldots, r^*_n) \equiv \text{isomer ratios}$$

where r is a coefficient denoting the percentage of isomers $A_1$ through $A_n$ in the sample; * is an abbreviation to denote an optimal value for the percentage of isomer $A_1$ through $A_n$; n is the total number of isomers being considered Scope The invention described herein is applicable to any tandem mass spectrometer, independently of the fragmentation mode used (ETD, ECD, HCD, CID, etc), mass analyzer type (ion trap, QTOF, etc), and ionization mode (positive or negative).

While the example shown are only glycans, it could have been any isomers that can be successfully fragmented in a tandem mass spectrometer.

The benefits of the library arise from the closely spaced fragmentation energies, which cause a given fragment to display in consecutive energy scans. The number of energies needed and the energy difference among different fragmentation energies is not universal, and depends on the family of compounds used as well as the instrument and acquisition conditions (e.g. polarity, tuning). We extensively tested it for glycans and a single energy gap (2V) and 19-21 consecutive acquisitions seems sufficient for all glycans analyzed. Changing acquisition conditions (e.g. positive to negative mode, or other changes in transfer optics of the instrument) will affect these values. Other families of compounds, like peptides, may require different values.

Multiple collision energy library entries are preferably of high enough signal/noise for the selection scheme of discriminatory ions to be accurate and reliable. Some reference isomers that generate only low intensity (noisy) measurements are possible (e.g. not high enough concentration can be can be generated experimentally). In those cases, noisy ".mce" files can be averaged via multiple replicates of the measurement, as demonstrated in this disclosure, in order to obtain higher quality library entries.

The scoring results will only be as accurate as the quality of the data obtained when analyzing (in a targeted manner) an uncharacterized sample. If the experimental data has low signal/noise, most isomers will have low, but non-negligible scores and will be hard to discriminate, appearing to be a mixture even when they are not. In addition, noisy experimental data may lead to false positive and false negative identifications. To overcome this problem, the experimental measurement can be performed multiple times and the normalized experimental (mzf, Ei) pairs averaged as with library entries. Also, in these cases a QQQ can be used, since it is more sensitive and more likely to provide higher quality data.

The presented methods, or any part(s) or function(s) thereof, may be implemented using hardware, software, or a combination thereof, and may be implemented in one or more computer systems or other processing systems. Where the presented methods refer to manipulations that are commonly associated with mental operations, such as, for example, providing, determining, obtaining, calculating, conducting, receiving, or performing, no such capability of a human operator is necessary. In other words, any and all of the operations described herein may be machine operations. Useful machines for performing the operation of the methods include general purpose digital computers or similar devices:

In fact, in one embodiment, the invention is directed toward one or more computer systems capable of carrying out the functionality described herein.

Computer Implementation.

In one embodiment, the invention is directed toward one or more computer systems capable of carrying out the functionality described herein. For example, FIG. 8 is a schematic drawing of a computer system 800 used to implement the methods presented above. Computer system 800 includes one or more processors, such as processor 804. The processor 804 is connected to a communication infrastructure 806 (e.g., a communications bus, cross-over bar, or network). Computer system 800 can include a display interface 802 that forwards graphics, text, and other data from the communication infrastructure 806 (or from a frame buffer not shown) for display on a local or remote display unit 830.

Computer system 800 also includes a main memory 808, such as random access memory (RAM), and may also include a secondary memory 810. The secondary memory 810 may include, for example, a hard disk drive 812 and/or a removable storage drive 814, representing a floppy disk drive, a magnetic tape drive, an optical disk drive, flash memory device, etc. The removable storage drive 814 reads from and/or writes to a removable storage unit 818. Removable storage unit 818 represents a floppy disk, magnetic tape, optical disk, flash memory device, etc., which is read by and written to by removable storage drive 814. As will be appreciated, the removable storage unit 818 includes a computer usable storage medium having stored therein computer software, instructions, and/or data.

In alternative embodiments, secondary memory 810 may include other similar devices for allowing computer programs or other instructions to be loaded into computer system 800. Such devices may include, for example, a removable storage unit 822 and an interface 820. Examples of such may include a program cartridge and cartridge interface (such as that found in video game devices), a removable memory chip (such as an erasable programmable read only memory (EPROM), or programmable read only memory (PROM)) and associated socket, and other removable storage units 822 and interfaces 820, which allow computer software, instructions, and/or data to be transferred from the removable storage unit 822 to computer system 800.

Computer system 800 may also include a communications interface 824. Communications interface 824 allows computer software, instructions, and/or data to be transferred between computer system 800 and external devices. Examples of communications interface 824 may include a modem, a network interface (such as an Ethernet card), a communications port, a Personal Computer Memory Card International Association (PCMCIA) slot and card, etc. Software and data transferred via communications interface 824 are in the form of signals 828 which may be electronic, electromagnetic, optical or other signals capable of being received by communications interface 824. These signals 828 are provided to communications interface 824 via a communications path (e.g., channel) 826. This channel 826 carries signals 828 and may be implemented using wire or cable, fiber optics, a telephone line, a cellular link, a radio frequency (RF) link, a wireless communication link, and other communications channels.

In this document, the terms "computer-readable storage medium," "computer program medium," and "computer usable medium" are used to generally refer to media such as removable storage drive 814, removable storage units 818, 822, data transmitted via communications interface 824, and/or a hard disk installed in hard disk drive 812. These computer program products provide computer software, instructions, and/or data to computer system 800. Embodiments of the present invention are directed to such computer program products.

Computer programs (also referred to as computer control logic) are stored in main memory 808 and/or secondary memory 810. Computer programs may also be received via communications interface 824. Such computer programs, when executed, enable the computer system 800 to perform the features of the present invention, as discussed herein. In particular, the computer programs, when executed, enable the processor 804 to perform the features of the presented methods. Accordingly, such computer programs represent controllers of the computer system 800. Where appropriate, the processor 804, associated components, and equivalent systems and sub-systems thus serve as "means for" performing selected operations and functions.

In an embodiment where the invention is implemented using software, the software may be stored in a computer program product and loaded into computer system 800 using removable storage drive 814, interface 820, hard drive 812, or communications interface 824. The control logic (software), when executed by the processor 804, causes the processor 804 to perform the functions and methods described herein.

In another embodiment, the methods are implemented primarily in hardware using, for example, hardware components such as application specific integrated circuits (ASICs). Implementation of the hardware state machine so as to perform the functions and methods described herein will be apparent to persons skilled in the relevant art(s). In yet another embodiment, the methods are implemented using a combination of both hardware and software.

Embodiments of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing firmware, software, routines, instructions, etc.

For example, in one embodiment, there is provided a computer-readable storage medium for identifying structural isomers, including instructions executable by at least one processing device that, when executed, cause the processing device to: (a) acquire one or more fragmentation signatures for a reference sample, wherein each fragmentation signature of the reference sample is acquired with a unique tandem mass spectrometry mode; (b) identify one or more discriminate features across the one or more fragmentation signatures of the reference sample; (c) acquire one or more fragmentation signatures for an unknown sample, wherein each fragmentation signature of the unknown sample is acquired with the corresponding unique tandem mass spectrometry mode of (a); (d) identify one or more discriminate features across the one or more fragmentation signatures of the unknown sample; (e) score the fragmentation signatures of (c) by comparing the discriminate features of the reference sample, from (b), against the discriminate features of the unknown sample, from (d); and (f) identify a structural isomer based on the score of (e). The unique tandem mass spectrometry modes may be multiple collision energy measurements. The computer-readable storage medium may further include instructions executable by at least one processing device that, when executed, cause the processing device to: (1) identify a group of most discriminant fragments that distinguishes a particular isomer from all other isomers in a family; (2) acquire an uncharacterized sample using a tandem mass spectrometer, given the group of most discriminant fragments; (3) determine, through the score of (e), which isomers are present based on acquired spectra; (4) determine, for chromatographically unresolved isomers, relative ratios of isomers given an MS/MS scan or a number of MRM transitions; and/or (5) calculate a superposition of a signature spectra for each isomer, and compare the superposition to obtained data.

EXAMPLES

Characterization of glycans from antibodies is essential to the design and production of biotherapeutics. The ability to rapidly characterize glycans has been limited by lengthy sample preparation steps, in addition to the structural complexity inherent to this class of molecules. To address these problems, we have developed a microfluidic chip that that integrates glycan preparation (rapid enzymatic cleavage of glycans from antibodies) and glycan analysis (LC/MS using PGC separation).

Structural isomers increase the complexity of glycan mixtures released from core proteins. To improve the ability to characterize these isomers, we have combined the chip workflow with MS/MS analysis on a Q-TOF. Multiple collision energies were applied to each glycan eluting from the PGC column, and the fragmentation profiles for each isomer were assessed using a computational method that determines the fragment ions that best discriminate one isomer from another. The fragment ions identified from this analysis were investigated in subsequent MRM experiments on a Triple Quadrupole, with the downstream goal of rapidly determining the relative abundance of a given isomer within a glycan mixture.

Figure 15:
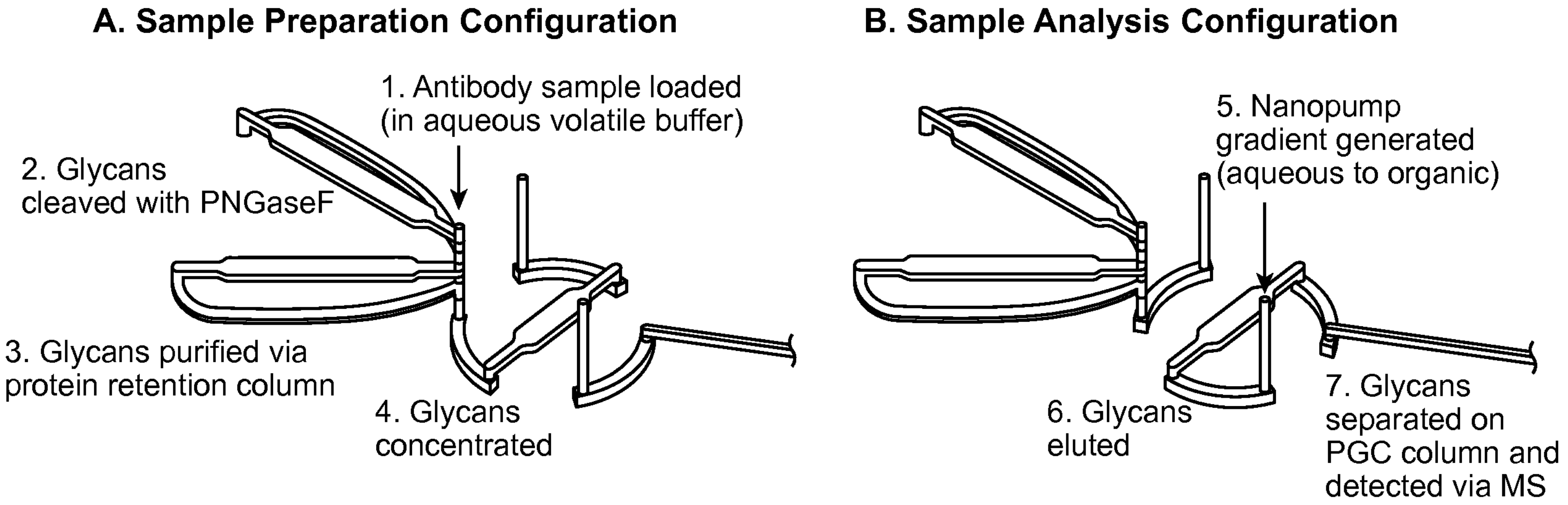
FIG. 15 shows HPLC-Chip flow path diagram during deglycosylation mode (A) and analysis mode (B).

FIG. 15 shows HPLC-Chip flow path diagram during deglycosylation mode (A) and analysis mode (B). While in deglycosylation-mode, the glycosylated mAb travels into an enzyme reactor where the glycans are cleaved by immobilized PNGase F. The deglycosylated antibody and the released glycans then travel into a channel packed with C8 beads, which retain the antibodies. Free glycans travel onward via a rotor groove to a PGC enrichment column, where the glycans are captured. The HPLC-chip valve then rotates to place the chip in analysis configuration. Once in this mode, a gradient is used to elute the glycans from the enrichment column and onto a downstream analytical column. The glycans are separated on the analytical column and eluted into the MS. This complete workflow including digestion and separation is performed within 20 minutes.

On-Chip Deglycosylation and Analysis of Antibodies.

The mAb used in this study was obtained from Sigma. The mAb was diluted in 100 mM ammonium acetate buffer, pH 7.6, to 1000 ng per μL. 100 mM ammonium acetate was used for sample loading and deglycosylation. Glycans were separated using a gradient that went from 2-22% B over 10 min (Solvent A: 0.1% FA in water, Solvent B: 0.1% FA in ACN). Multiple collision energies, ranging from 0-55 V, were applied to the eluting glycans during MS/MS experiments.

Figure 16:
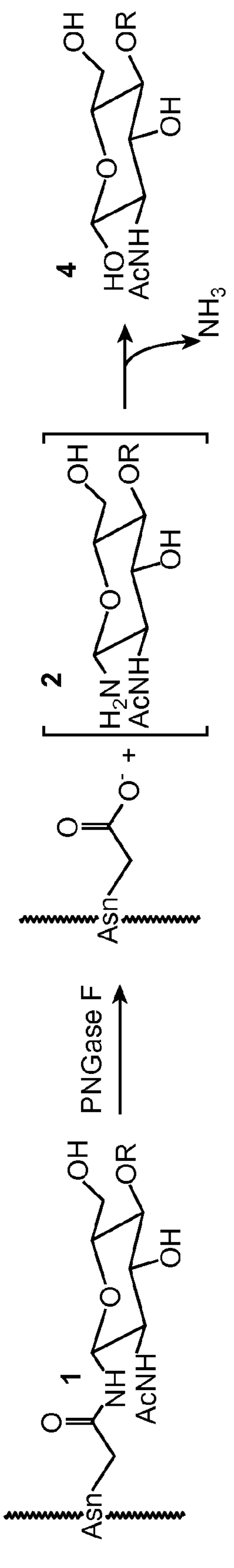
FIG. 16 shows PNGase F cleaves the C—N bond of the glycosylated asparagine side chain on a core protein.
Figure 17:
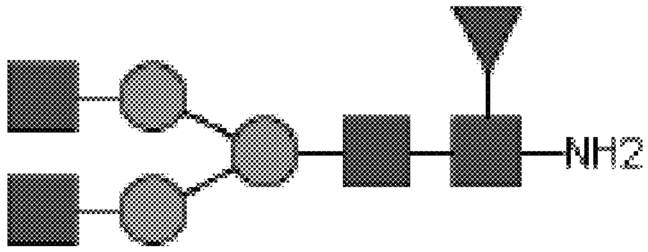
FIG. 17 shows the glycan is released as a β-glycosylamine intermediate.

As shown in FIG. 16, PNGase F cleaves the C—N bond of the glycosylated asparagine side chain on a core protein. The glycan is thus released as a β-glycosylamine intermediate as shown in FIG. 17. This amine acts as an inherent reducing end label. MS/MS fragments that contain a GlcNAc—NH2 result from the reducing end of the molecule. The ability to determine fragments resultant from the reducing end increases the ability to assign glycan structures.

Figure 18:
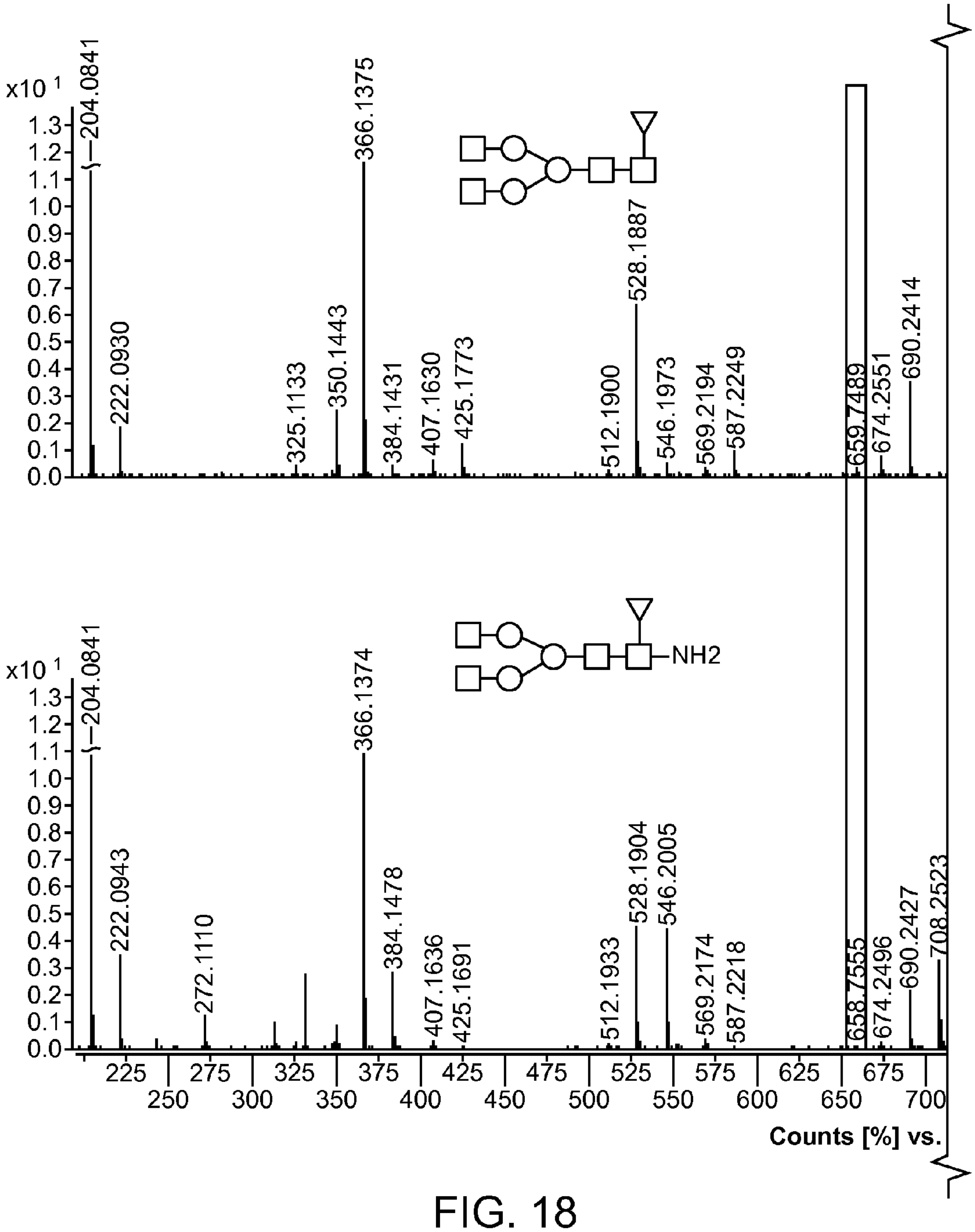
FIG. 18 shows MS/MS spectra of the hydroxyl (top spectrum) and β-glycosylamine (bottom spectrum) form of G0.
Figure 18:
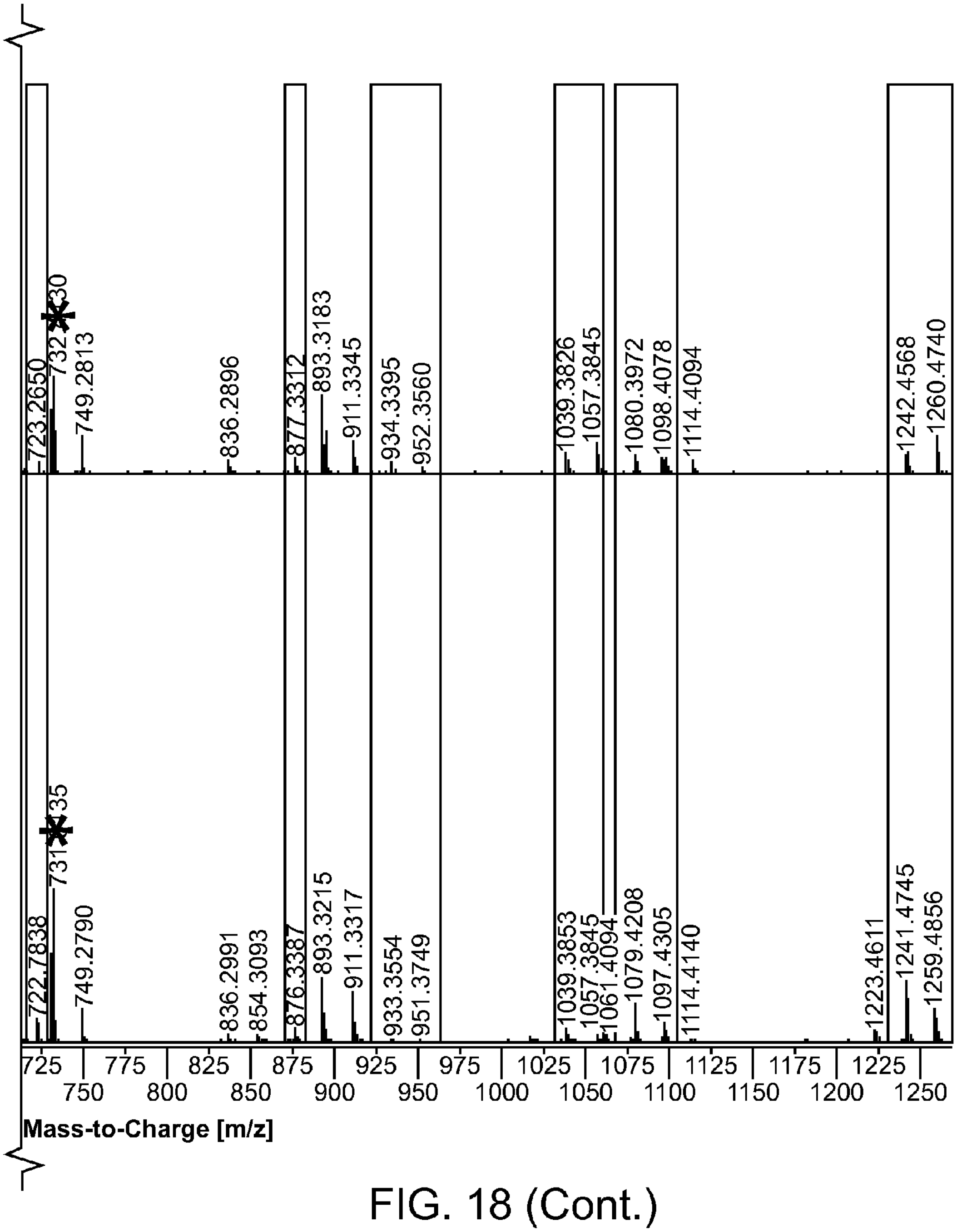

FIG. 18 shows MS/MS spectra of the hydroxyl (top spectrum) and β-glycosylamine (bottom spectrum) form of G0. The hydroxyl form of the glycan was produced by allowing the released glycans to remain on the enrichment column long enough for the —NH2 to hydrolyze. A significant number of reducing end fragments are present in the G0-NH2 MS/MS spectrum, as indicated by the blue highlights. Such fragments will be useful for future, more complex experiments where they will decrease the ambiguity of structural assignments based on MS/MS spectra. These MS/MS spectra were produced by averaging the signal produced from the multiple collision energy fragmentation.

Figure 19:
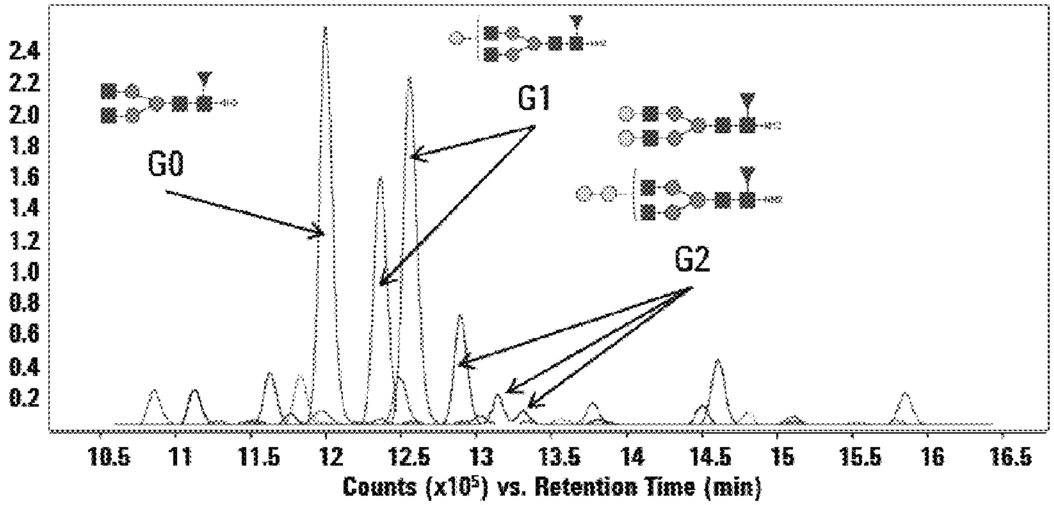
FIG. 19 shows extracted ion chromatograms of glycans released from mAbs using PNGase F.
Figure 20:
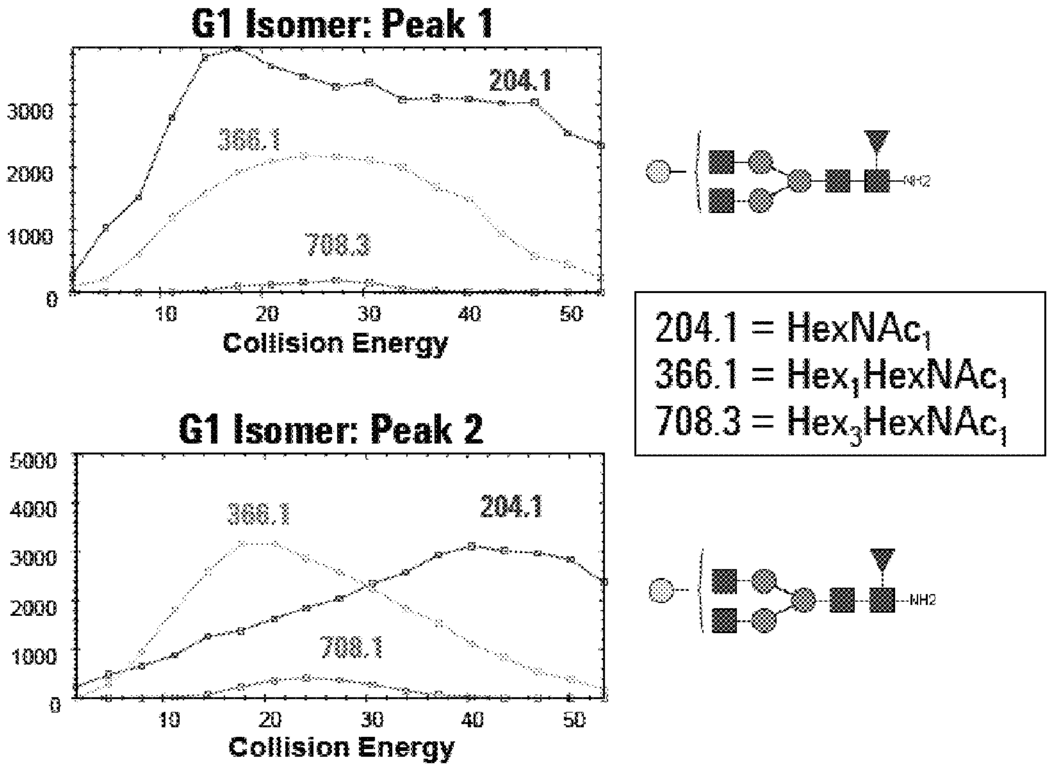
FIG. 20 shows normalized intensity versus collision energy for the most discriminant fragments of G1 isomers.

FIG. 19 shows extracted ion chromatograms of glycans released from mAbs using PNGase F. Using a 10-min gradient, glycans were separated and the presence of glycan isomers was evidenced by multiple peaks for a given m/z (for example, the two green peaks for the m/z corresponding to G1). The glycan isomers were fragmented using multiple collision energies (starting from 0 V and ramping to 55 V). The MS/MS spectra were investigated using a computational method that determines the most discriminant fragment ions for each isomer as a function of collision energy FIG. 20 shows normalized intensity versus collision energy for the most discriminant fragments of G1 isomers. The two peaks corresponding to G1 in FIG. 19 were fragmented using multiple collision energies. The results show that the isomers fragment differently, as indicated by the abundance of particular fragment ions as a function of collision energy. For example, for the first G1 isomer peak (peak 1), the fragment at m/z 204.1 (HexNAc) is intense at low and high collision energy. Conversely, for the second G1 isomer peak (peak 2), the fragment at m/z 204.1 reaches a peak in intensity at around 40 V. Computational comparison of all fragment ion intensities as a function of collision energy yielded fragment ion/collision energy pairs that are diagnostic of a particular glycan isomer.

Figure 21:
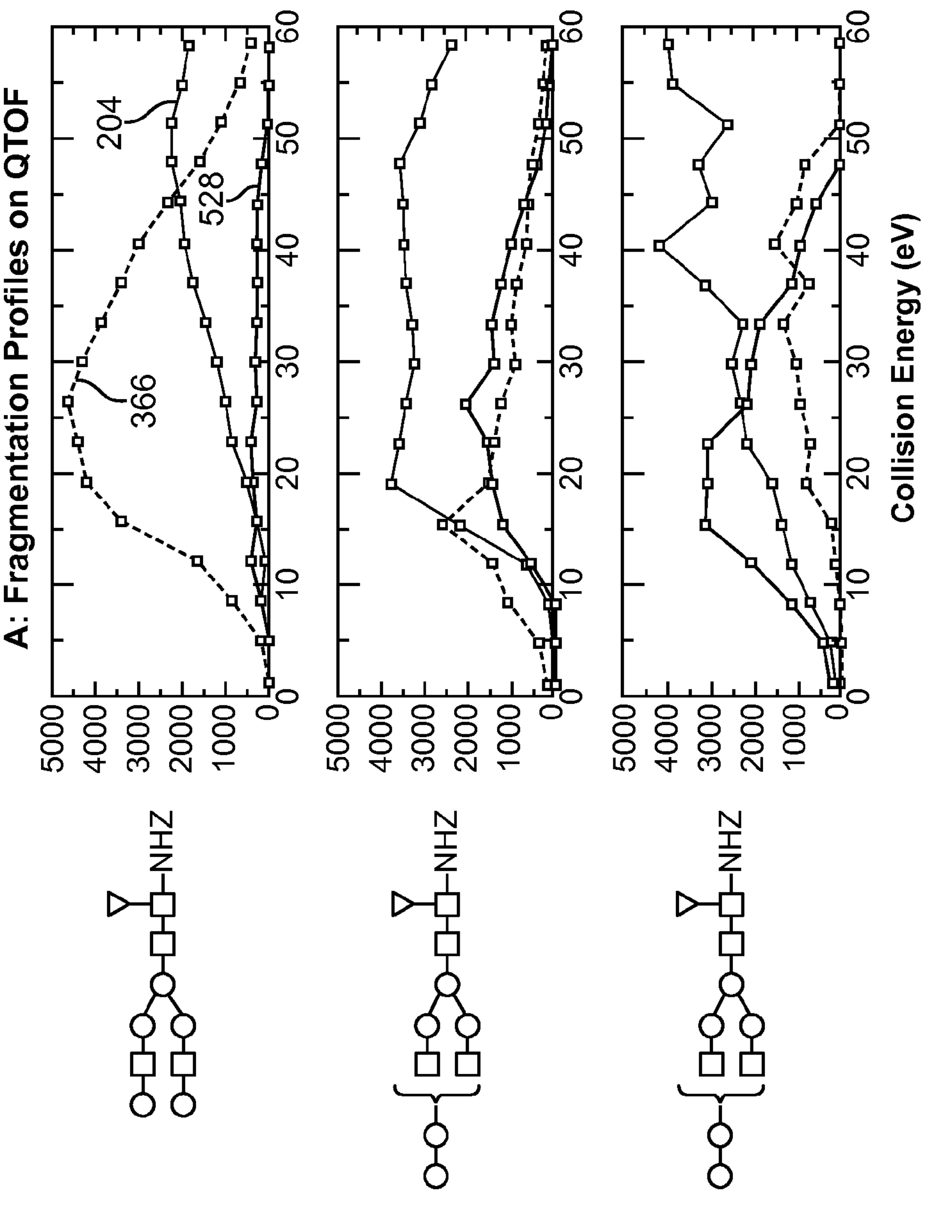
FIG. 21 (A) shows MS/MS of G2 isomers was acquired on a QTOF instrument as a function of collision energy; (B) shows three collision energies were used to profile the discriminant ions on a QQQ; and (C) shows an unknown isomer as evaluated on a QQQ and its fragmentation signature.
Figure 21:
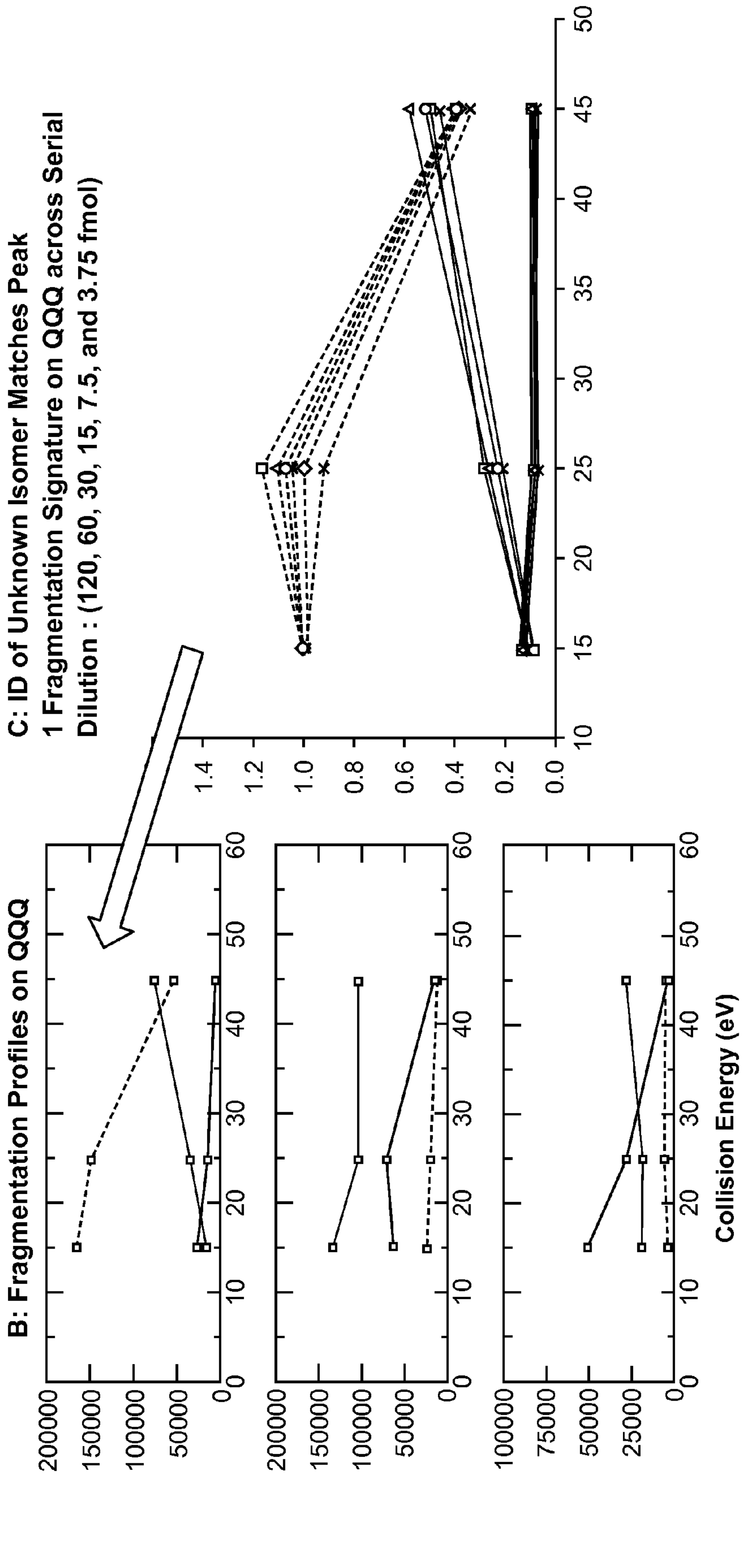

FIG. 21A shows MS/MS of G2 isomers was acquired on a QTOF instrument as a function of collision energy. The Ink's shown, 204.1, 366.1, and 528.2 were the most discriminant fragments. FIG. 21B shows three collision energies were used to profile the discriminant ions on a QQQ. The resultant plots were consistent with the QTOF data in FIG. 21A. FIG. 21C shows an unknown isomer was evaluated on the QQQ and its fragmentation signature (intensity of 204, 366, and 528 at the chosen collision energies) was found to be consistent with that of the first G2 isomer. The fragmentation signature of the unknown isomer was consistent across a serial dilution of the mAB sample (~120, 60, 30, 15, 7.5, and 3.75 fmol G2 mixture on column).

CONCLUSION

The foregoing description of the invention has been presented for purposes of illustration and description. It is not intended to be exhaustive or to limit the invention to the precise form disclosed. Other modifications and variations may be possible in light of the above teachings. The embodiments were chosen and described in order to best explain the principles of the invention and its practical application, and to thereby enable others skilled in the art to best utilize the invention in various embodiments and various modifications as are suited to the particular use contemplated. It is intended that the appended claims be construed to include other alternative embodiments of the invention; including equivalent structures, components, methods, and means.

Unless defined otherwise, all technical and scientific terms used herein have the same meaning as commonly understood by one of ordinary skill in the art to which this invention belongs.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination. All combinations of the embodiments are specifically embraced by the present invention and are disclosed herein just as if each and every combination was individually and explicitly disclosed, to the extent that such combinations embrace operable processes and/or devices/systems/kits.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

It is to be appreciated that the Detailed Description section, and not the Summary and Abstract sections, is intended to be used to interpret the claims. The Summary and Abstract sections may set forth one or more, but not all exemplary embodiments of the present invention as contemplated by the inventor(s), and thus, are not intended to limit the present invention and the appended claims in any way.

What is claimed is:

1. A mass spectrometry method for identifying structural isomers, the method comprising, in a tandem mass spectrometer:

(a) acquiring a plurality of fragmentation signatures using a plurality of unique tandem mass spectrometry modes for a reference sample, wherein each fragmentation signature of the reference sample is acquired with a unique tandem mass spectrometry mode;

(b) identifying, via a processor, one or more discriminant features across the plurality of fragmentation signatures of the reference sample;

(c) acquiring a plurality of fragmentation signatures for an unknown sample, wherein each fragmentation signature of the unknown sample is acquired with the unique tandem mass spectrometry modes according to the one or more discriminant features of step (b);

(d) scoring the fragmentation signatures of step (c) by comparing the one or more discriminant features of the reference sample, from step (b), against the one or more discriminant features of the unknown sample; and (e) identifying a structural isomer based on the score of step (d).

2. The method of claim 1, wherein the unique tandem mass spectrometry modes are multiple collision energy measurements.

3. The method of claim 1, further comprising:

identifying a group of most discriminant fragments that distinguishes a particular isomer from all other isomers in a family.

4. The method of claim 3, further comprising:

acquiring a plurality of spectra for the unknown sample using the tandem mass spectrometer based on the group of most discriminant fragments.

5. The method of claim 4, further comprising:

determining, through the scoring of step (d), which isomers are present in the unknown sample based on the acquired plurality of spectra.

6. The method of claim 1, further comprising:

determining, for chromatographically unresolved isomers, relative ratios of isomers given the plurality of fragmentation signatures of step (c).

7. The method of claim 1, further comprising:

calculating a superposition of a signature spectra for each isomer; and comparing the superposition to obtained data.

8. A non-transitory computer-readable storage medium for identifying structural isomers, comprising:

instructions executable by at least one processing device that, when executed, cause the processing device to (a) acquire, using a tandem mass spectrometer, a plurality of fragmentation signatures using a plurality of unique tandem mass spectrometry modes for a reference sample, wherein each fragmentation signature of the reference sample is acquired with a unique tandem mass spectrometry mode;

(b) identify one or more discriminant features across the plurality of fragmentation signatures of the reference sample;

(c) acquire, using the tandem mass spectrometer, a plurality of fragmentation signatures for an unknown sample, wherein each fragmentation signature of the unknown sample is acquired with the corresponding unique tandem mass spectrometry modes of (a);

(d) score the fragmentation signatures of (c) by comparing the discriminate features of the reference sample, from (b), against the discriminant features of the unknown sample; and (e) identify a structural isomer based on the score of (d).

9. The non-transitory computer-readable storage medium of claim 8, wherein the unique tandem mass spectrometry modes are multiple collision energy measurements.

10. The non-transitory computer-readable storage medium of claim 8, further comprising:

instructions executable by at least one processing device that, when executed, cause the processing device to identify a group of most discriminant fragments that distinguishes a particular isomer from all other isomers in a family.

11. The non-transitory computer-readable storage medium of claim 10, further comprising:

instructions executable by at least one processing device that, when executed, cause the processing device to acquire a plurality of spectra for the unknown sample using the tandem mass spectrometer based on the group of most discriminant fragments.

12. The non-transitory computer-readable storage medium of claim 11, further comprising:

instructions executable by at least one processing device that, when executed, cause the processing device to determine, through the score of (d), which isomers are present in the unknown sample based on the acquired plurality of spectra.

13. The non-transitory computer-readable storage medium of claim 8, further comprising:

instructions executable by at least one processing device that, when executed, cause the processing device to determine, for chromatographically unresolved isomers, relative ratios of isomers given the plurality of fragmentation signatures of step (c).

14. The non-transitory computer-readable storage medium of claim 8, further comprising:

instructions executable by at least one processing device that, when executed, cause the processing device to calculate a superposition of a signature spectra for each isomer, and compare the superposition to obtained data.

15. A mass spectrometer system, the system comprising:

a library of spectra including a plurality of fragmentation signatures for reference samples, wherein each fragmentation signature of the reference sample is acquired using a plurality of unique tandem mass spectrometry modes, wherein one or more discriminant features are identified across the plurality of fragmentation signatures of the reference samples;

an acquisition module for acquiring a plurality of fragmentation signatures for an unknown sample, wherein each fragmentation signature of the unknown sample is acquired with the corresponding unique tandem mass spectrometry modes of the reference samples, and wherein one or more discriminant features across the plurality of fragmentation signatures of the unknown sample are identified; and a processor module for scoring the fragmentation signatures of the unknown samples by comparison with the discriminant features of the reference sample to thereby identify a structural isomer based on the score.

16. The system of claim 15, wherein the unique tandem mass spectrometry modes are multiple collision energy measurements.

17. The system of claim 15, wherein the processor module is configured to identify a group of most discriminant fragments that distinguishes a particular isomer from all other isomers in a family.

18. The system of claim 17, wherein the processor module is configured to acquire a plurality of spectra for the unknown sample using a tandem mass spectrometer based on the group of most discriminant fragments.

19. The system of claim 18, wherein the processor module is configured to determine, through the score, which isomers are present in the unknown sample based on the acquired plurality of spectra.

20. The system of claim 15, wherein the processor module is configured to determine, for chromatographically unresolved isomers, relative ratios of isomers given an MS/MS scan or a number of MRM transitions.

* * * * *